(12) United States Patent
Chen et al.

(10) Patent No.: US 10,484,875 B2
(45) Date of Patent: Nov. 19, 2019

(54) TECHNIQUES FOR TRANSMISSION OF SOUNDING REFERENCE SIGNAL IN SHARED RADIO FREQUENCY SPECTRUM BAND

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 35 days.

(21) Appl. No.: 15/392,290

(22) Filed: Dec. 28, 2016

(65) Prior Publication Data

US 2017/0195890 A1 Jul. 6, 2017

Related U.S. Application Data

(60) Provisional application No. 62/273,294, filed on Dec. 30, 2015.

(51) Int. Cl.
*H04W 16/14* (2009.01)
*H04L 5/00* (2006.01)
(Continued)

(52) U.S. Cl.
CPC ............ *H04W 16/14* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2013/0272233 A1 10/2013 Dinan
2013/0279433 A1* 10/2013 Dinan ............... H04W 56/0005
370/329
(Continued)

OTHER PUBLICATIONS

ISA/EP, International Search Report and Written Opinion of the International Searching Authority, Int'l Application No. PCT/US2016/069173, Apr. 7, 2017, European Patent Office, Rijswijk, NL, 14 pgs.
(Continued)

*Primary Examiner* — Yaotang Wang
(74) *Attorney, Agent, or Firm* — Holland & Hart LLP

(57) ABSTRACT

Sounding reference signal (SRS) transmissions in a shared RF spectrum band, alone or in conjunction with a dedicated RF spectrum band, may be transmitted using two or more uplink component carriers (CCs). A UE may identify that the two or more CCs are in a same timing advance group (TAG), and transmit a SRS transmission and a physical uplink shared channel (PUSCH) or physical uplink control channel (PUCCH) transmission during a same uplink symbol. A UE may transmit a SRS based on a minimum configured power in the event that the UE is power limited during a SRS transmission symbol. A channel priority assigned to a CC carrying a SRS transmission in a shared RF spectrum band may be set to a higher channel priority than a channel priority for a similar transmission using a dedicated RF spectrum band.

22 Claims, 14 Drawing Sheets

(51) Int. Cl.
*H04W 52/30* (2009.01)
*H04W 72/04* (2009.01)
(52) U.S. Cl.
CPC ....... *H04W 52/30* (2013.01); *H04W 72/0413* (2013.01); *H04W 72/0446* (2013.01); *H04W 72/0453* (2013.01)

(56) References Cited

U.S. PATENT DOCUMENTS

| | | |
|---|---|---|
| 2015/0365218 A1 | 12/2015 | Yang et al. |
| 2016/0100420 A1* | 4/2016 | Chen .................... H04W 16/14 370/329 |
| 2016/0262023 A1* | 9/2016 | Hiertz ................. H04W 74/006 |

OTHER PUBLICATIONS

Qualcomm Incorporated, "Uplink Waveform for LAA," 3GPP TSG RAN WG1 Meeting #81, R1-152790, Fukuoka, Japan, Apr. 25-29, 2015, 4 pgs., XP050971219, 3rd Generation Partnership Project.

Qualcomm Incorporated, "SRS Operation in Multiple TA Offset CA," 3GPP TSG RAN WG1 Meeting #68, R1-120539, Dresden, Germany, Feb. 6-10, 2012, 4 pgs., XP050562977, 3rd Generation Partnership Project.

\* cited by examiner

TECHNIQUES FOR TRANSMISSION OF SOUNDING REFERENCE SIGNAL IN SHARED RADIO FREQUENCY SPECTRUM BAND

CROSS REFERENCES

The present Application for Patent claims priority to U.S. Provisional Patent Application No. 62/273,294 by Chen, et al., entitled "Techniques For Transmission of Sounding Reference Signal in Shared Radio Frequency Spectrum Band," filed Dec. 30, 2015, assigned to the assignee hereof.

BACKGROUND

Field of the Disclosure

The present disclosure, for example, relates to wireless communication systems, and more particularly to techniques for transmission of sounding reference signals in a shared radio frequency (RF) spectrum band and a dedicated RF spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

Some modes of communication may enable communication between a base station and a UE in a shared radio frequency (RF) spectrum band, or in different RF spectrum bands (e.g., in a dedicated RF spectrum band and a shared RF spectrum band) of a cellular network. However, in contrast to a carrier in a dedicated RF spectrum band, which may be allocated for use by the devices of one public land mobile network (PLMN) and be available to a base station or a UE of the PLMN at predetermined (or all) times, a carrier in a shared RF spectrum band may be available for use by the devices of the PLMN intermittently. This intermittent availability may be a result of contention for access to the carrier of the shared RF spectrum band, between devices of the PLMN, devices of one or more other PLMNs, and/or other devices (e.g., Wi-Fi devices). For some radio frames, a device of a PLMN may win contention for access to a carrier in the shared RF spectrum band, while for other radio frames, the device may not win contention for access to the carrier in the shared RF spectrum band.

Because of the intermittent availability of carriers in a shared RF spectrum band, base stations and UEs may use techniques that provide fairness in coexistence with other users of the shared RF spectrum band, and that still provide reliable communications. For example, such techniques may include transmitting some information or types of radio frames using the dedicated RF spectrum band and transmitting other information (e.g., lower priority information) or radio frames using the shared RF spectrum band. Such techniques may be referred to as License-Assisted Access (LAA), and it may be desirable in some systems to periodically adjust some parameters associated with one or both of the dedicated RF spectrum band or the shared RF spectrum band, in order to enhance system efficiency. Parameters may be adjusted based on one or more measurements related to channel quality, for example, that may be determined partly on a sounding reference signal (SRS) transmitted from a UE to a base station. In some deployments in which uplink transmissions may be transmitted using a shared RF spectrum band, a SRS may be transmitted using the shared RF spectrum band that may be used to estimate channel quality. Efficient techniques for transmitting a SRS in a shared RF spectrum band may enhance the operation of such networks.

SUMMARY

The present disclosure, for example, relates to wireless communication systems, and more particularly to techniques for transmission of a sounding reference signal (SRS) in a shared radio frequency (RF) spectrum band and a dedicated RF spectrum band. As previously indicated, in some cases it may be desirable to adjust one or more parameters for uplink wireless transmissions between a user equipment (UE) and a base station based in part on a SRS transmitted by the UE. However, SRS transmission techniques currently used by Long-Term Evolution (LTE) and LTE-Advanced (LTE-A) systems may have a UE drop SRS transmissions in some situations. For example, a UE may drop an SRS transmission in cases where the UE is power limited, or if a physical uplink shared channel (PUSCH) or physical uplink control channel (PUSCH) transmission overlaps a same symbol as the SRS transmission. Additionally, when using a shared RF spectrum band a UE may not win contention for a wireless transmission, which may further reduce SRS transmission opportunities of a UE. Various aspects of the present disclosure provide techniques for SRS transmission using a shared RF spectrum band that may increase the likelihood that the SRS is transmitted, and may thus enhance network efficiency by providing channel quality information to a UE that may be used for setting one or more scheduling or transmission parameters of the UE or base station.

The techniques described in the present disclosure provide for SRS transmissions in a shared RF spectrum band alone or in conjunction with a dedicated RF spectrum band (or any available RF spectrum band). In some examples, two or more uplink component carriers (CCs) may be configured for uplink transmissions from a UE, with at least one of the uplink CCs using a shared RF spectrum band. A UE may identify that the two or more CCs are in a same timing advance group (TAG), and transmit a SRS transmission and a PUSCH/PUCCH transmission during a same uplink symbol (either on the same or a different CC as the SRS transmission).

In some examples, a UE may transmit a SRS based on a minimum configured power in the event that the UE is power limited during a SRS transmission symbol. Such techniques may provide additional opportunities for a UE to transmit a SRS, which may provide a base station with more accurate channel quality for uplink/downlink transmissions of the UE and may allow for transmission or scheduling parameters to be set based on the more accurate channel quality information. In some examples, a channel priority assigned to a CC carrying a SRS transmission in a shared RF spectrum band may be set to a higher channel priority than a channel priority for a similar transmission using a dedicated RF spectrum band. In some examples, a set of downlink CCs may be configured for downlink transmissions with a subset of the set of CCs configured for uplink transmissions, and a UE may use a CC outside of the subset of CCs for SRS transmission.

A method of wireless communication at a UE is described. The method may include establishing wireless communications using two or more uplink CCs in a wireless communications network, at least one of the two or more uplink CCs using a shared RF spectrum band; identifying that each of the two or more uplink CCs are configured to be in a same TAG; identifying a SRS to be transmitted in a first symbol using a first uplink CC of the two or more uplink CCs; determining that one or more of a PUSCH transmission or a PUCCH transmission is to be transmitted in the first symbol using a second uplink CC of the two or more uplink CCs; and transmitting, in the first symbol, the SRS using the first uplink CC and one or more of the PUSCH or PUCCH using the second uplink CC.

An apparatus for wireless communication is described. The apparatus may include means for establishing wireless communications using two or more uplink CCs in a wireless communications network, at least one of the two or more uplink CCs using a shared RF spectrum band; means for identifying that each of the two or more uplink CCs are configured to be in a same TAG; means for identifying a SRS to be transmitted in a first symbol using a first uplink CC of the two or more uplink CCs; means for determining that one or more of a PUSCH transmission or a PUCCH transmission is to be transmitted in the first symbol using a second uplink CC of the two or more uplink CCs; and means for transmitting, in the first symbol, the SRS using the first uplink CC and one or more of the PUSCH or PUCCH using the second uplink CC.

A further apparatus is described. The apparatus may include a processor, memory in electronic communication with the processor, and instructions stored in the memory. The instructions may be operable to cause the processor to establish wireless communications using two or more uplink CCs in a wireless communications network, at least one of the two or more uplink CCs using a shared RF spectrum band; identify that each of the two or more uplink CCs are configured to be in a same TAG; identify a sounding reference signal (SRS) to be transmitted in a first symbol using a first uplink CC of the two or more uplink CCs; determine that one or more of a PUSCH transmission or a PUCCH transmission is to be transmitted in the first symbol using a second uplink CC of the two or more uplink CCs; and transmit, in the first symbol, the SRS using the first uplink CC and one or more of the PUSCH or PUCCH using the second uplink CC.

A non-transitory computer readable medium for wireless communication is described. The non-transitory computer-readable medium may include instructions to cause a processor to establish wireless communications using two or more uplink CCs in a wireless communications network, at least one of the two or more uplink CCs using a shared RF spectrum band; identify that each of the two or more uplink CCs are configured to be in a same TAG; identify a SRS to be transmitted in a first symbol using a first uplink CC of the two or more uplink CCs; determine that one or more of a PUSCH transmission or a PUCCH transmission is to be transmitted in the first symbol using a second uplink CC of the two or more uplink CCs; and transmit, in the first symbol, the SRS using the first uplink CC and one or more of the PUSCH or PUCCH using the second uplink CC.

Some examples of the method, apparatus, or non-transitory computer-readable medium described above may further include processes, features, means, or instructions for determining that a transmission during the first symbol using the two or more uplink CCs is not power limited. In some examples, the method, apparatus, or non-transitory computer-readable medium described above may further include processes, features, means, or instructions for determining that the transmission during the first symbol using the two or more uplink CCs is power limited; and dropping the transmission of the SRS.

In some examples of the method, apparatus, or non-transitory computer-readable medium described above, the transmitting may include determining that the transmission during the first symbol using the two or more uplink CCs is power limited; and transmitting of the SRS based on a minimum power level configured for transmission of the first uplink CC. In some examples, the first uplink CC is part of the shared RF spectrum band. In other examples, the first uplink CC is not part of the shared RF spectrum band.

Some examples of the method, apparatus, or non-transitory computer-readable medium described above may further include processes, features, means, or instructions for transmitting the SRS during a regular uplink subframe of a radio frame. Other examples of the method, apparatus, or non-transitory computer-readable medium described above may further include processes, features, means, or instructions for transmitting the SRS during a special subframe of a radio frame. For example, the two or more SRS symbols may be transmitted during an uplink pilot time slot (UpPTS) of the special subframe.

In some examples of the method, apparatus, or non-transitory computer-readable medium described above, the SRS may be transmitted using the first uplink CC over the shared RF spectrum band using a channel priority that is different than a channel priority for transmitting the SRS using a CC over a dedicated RF spectrum band. In some examples, the SRS may be formatted to span a frequency bandwidth of the first symbol, and the formatting may be based at least in part on a power spectral density limit of the frequency bandwidth.

In some examples of the method, apparatus, or non-transitory computer-readable medium described above, the two or more uplink CCs may include a first set of uplink CCs that are allocated for uplink transmissions during a transmission time interval (TTI), and the transmitting may include transmitting one or more of the PUCCH transmission or PUSCH transmission using the first set of uplink CCs; and transmitting the SRS using a different uplink CC that is outside of the first set of uplink CCs. In some examples, the different uplink CC is a CC associated with a second set of downlink CCs, and the first set of uplink CCs includes fewer CCs than the second set of downlink CCs. In some examples, the first uplink CC and the second uplink CC are different CCs.

A method of wireless communication at a base station is described. The method may include configuring wireless communications at a UE using two or more uplink CCs in a wireless communications network, at least one of the two or more uplink CCs using a shared RF spectrum band; configuring each of the two or more uplink CCs to be in a same TAG; and configuring a SRS to be transmitted in a first symbol using a first uplink CC of the two or more uplink CCs concurrently with one or more of a PUSCH transmission or a PUCCH transmission to be transmitted during the first symbol using a second uplink CC of the two or more uplink CCs.

An apparatus for wireless communication is described. The apparatus may include means for configuring wireless communications at a UE using two or more uplink CCs in a wireless communications network, at least one of the two or more uplink CCs using a shared RF spectrum band; means for configuring each of the two or more uplink CCs to be in a same TAG; and means for configuring a SRS to be transmitted in a first symbol using a first uplink CC of the two or more uplink CCs concurrently with one or more of a PUSCH transmission or a PUCCH transmission to be transmitted during the first symbol using a second uplink CC of the two or more uplink CCs.

A further apparatus is described. The apparatus may include a processor, memory in electronic communication with the processor, and instructions stored in the memory. The instructions may be operable to cause the processor to configure wireless communications at a user equipment (UE) using two or more uplink component carriers (CCs) in a wireless communications network, at least one of the two or more uplink CCs using a shared RF spectrum band; configure each of the two or more uplink CCs to be in a same timing advance group (TAG); and configure a sounding reference signal (SRS) to be transmitted in a first symbol using a first uplink CC of the two or more uplink CCs concurrently with one or more of a physical uplink shared channel (PUSCH) transmission or a physical uplink control channel (PUCCH) transmission to be transmitted during the first symbol using a second uplink CC of the two or more uplink CCs.

A non-transitory computer readable medium for wireless communication is described. The non-transitory computer-readable medium may include instructions to cause a processor to configure wireless communications at a user equipment (UE) using two or more uplink component carriers (CCs) in a wireless communications network, at least one of the two or more uplink CCs using a shared RF spectrum band; configure each of the two or more uplink CCs to be in a same timing advance group (TAG); and configure a sounding reference signal (SRS) to be transmitted in a first symbol using a first uplink CC of the two or more uplink CCs concurrently with one or more of a physical uplink shared channel (PUSCH) transmission or a physical uplink control channel (PUCCH) transmission to be transmitted during the first symbol using a second uplink CC of the two or more uplink CCs.

Some examples of the method, apparatus, or non-transitory computer-readable medium described above may further include processes, features, means, or instructions for configuring the SRS to be transmitted based on a minimum transmission power level that is to be used when a transmission during the first symbol using the two or more uplink CCs is power limited. In some examples of the method, apparatus, or non-transitory computer-readable medium described above, the first uplink CC may be part of the shared RF spectrum band. In other examples, the first uplink CC may not be part of the shared RF spectrum band.

In some examples of the method, apparatus, or non-transitory computer-readable medium described above the SRS may be configured to be transmitted during a regular uplink subframe of a radio frame. In other examples, the SRS may be configured to be transmitted during a special subframe of a radio frame, such as in one or more SRS symbols to be transmitted during an uplink pilot time slot (UpPTS) of the special subframe.

Some examples of the method, apparatus, or non-transitory computer-readable medium described above may further include processes, features, means, or instructions for configuring the first uplink CC to be transmitted over the shared RF spectrum band using a channel priority that is different than a channel priority for transmitting the second uplink CC to be transmitted over a dedicated RF spectrum band. In some examples, the SRS may be configured to span a frequency bandwidth of the first symbol, which may be based at least in part on a power spectral density limit of the frequency bandwidth.

Some examples of the method, apparatus, or non-transitory computer-readable medium described above may further include processes, features, means, or instructions for allocating a first set of uplink CCs that includes the two or more uplink CCs for uplink transmissions during a transmission time interval (TTI); transmitting downlink transmissions using a second set of downlink CCs that includes different CCs than the first set of uplink CCs; and the configuring the SRS to be transmitted may further include configuring the SRS to be transmitted using a CC of the second set of downlink CCs that is outside of the first set of uplink CCs. In some examples, the first uplink CC and the second uplink CC are different CCs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present description may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
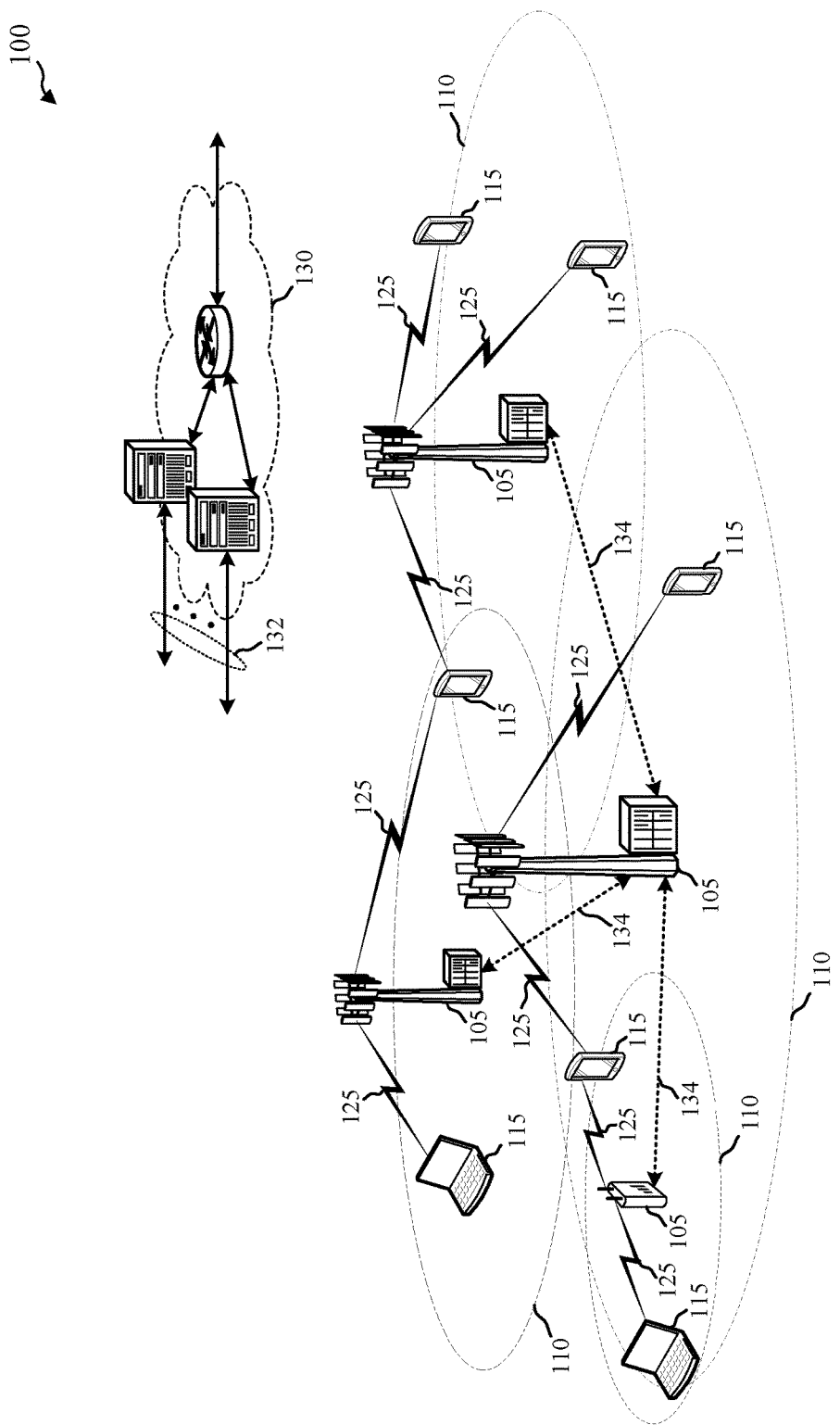
FIG. 1 illustrates an example of a wireless communication system, in accordance with various aspects of the present disclosure.

Techniques are described in which a shared radio frequency (RF) spectrum band is used for at least a portion of communications over a wireless communication system. In some examples, the shared RF spectrum band may be used for LTE/LTE-A communications and may be used to transmit a sounding reference signal (SRS) by a user equipment (UE). The shared RF spectrum band may be used in combination with, or independent from, a dedicated RF spectrum band. The dedicated RF spectrum band may include a RF spectrum band for which transmitting apparatuses may not contend for access (e.g., a RF spectrum band licensed to particular users for particular uses, such as a licensed RF spectrum band usable for LTE/LTE-A communications). The shared RF spectrum band may include a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner).

Because a device may use both a dedicated RF spectrum band and a shared RF spectrum band, base stations and UEs described in aspects of the disclosure may use techniques to provide SRS transmissions to enable enhanced system operation. The present disclosure provides techniques for transmission of a SRS in a shared RF spectrum band and a dedicated RF spectrum band. In some examples, two or more uplink component carriers (CCs) may be configured for uplink (UL) transmissions from a UE, with at least one of the uplink CCs using a shared RF spectrum band. A UE may identify that the two or more CCs are in a same timing advance group (TAG), and transmit a SRS transmission and a PUSCH/PUCCH transmission during a same uplink symbol (either on the same or a different CC as the SRS transmission).

In some examples, a UE may transmit a SRS based on a minimum configured power in the event that the UE is power limited during a SRS transmission symbol. In some examples, a channel priority assigned to a CC carrying a SRS transmission in a shared RF spectrum band may be set to a higher channel priority than a channel priority for a similar transmission using a dedicated RF spectrum band. In some examples, a set of downlink CCs may be configured for downlink transmissions with a subset of the set of CCs configured for uplink transmissions, and a UE may use a CC outside of the subset of CCs for SRS transmission.

Such techniques may provide enhanced opportunities for a UE to transmit SRS, which may in turn enhance system operation and efficiency. As previously indicated, in some cases it may be desirable to adjust one or more scheduling or transmission parameters for uplink or downlink wireless transmissions between a UE and a base station based in part on a SRS transmitted by the UE. SRS transmission techniques currently used by Long-Term Evolution (LTE) and LTE-Advanced (LTE-A) may not enable a UE to transmit a SRS in some situations. For example, existing techniques provide that, for CCs in a same TAG, a SRS transmission is dropped in the event that a physical uplink shared channel (PUSCH) or physical uplink control channel (PUCCH) transmission overlaps with a time for transmission of the SRS. Furthermore, a SRS transmission according to current LTE/LTE-A techniques may be dropped in the event that a UE is power limited for a transmission that is to include the SRS. Thus, in some situations SRS transmissions may be dropped, which may lead to reduced channel quality information associated with the UE. Additionally, when using a shared RF spectrum band, a UE may not win contention for a wireless transmission, and this may further reduce the number of SRS transmissions of a UE. Various aspects of the present disclosure may increase the likelihood that the SRS is transmitted, and may thus enhance network efficiency by providing channel quality information to a UE that may be used for setting one or more transmission parameters of the UE or base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links. UEs 115 may transmit SRSs according to various techniques such as described below in various examples, which may be used by base stations 105 in determining one or more scheduling or transmission parameters.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) RF spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A RLC layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more CCs, where each CC may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. (collectively referred to as "data" in some cases in this disclosure). The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs). The number of CCs used for uplink transmissions may, in some cases, be different than the number of CCs used for downlink transmissions. For example, a base station 105 may configure three downlink CCs and two uplink CCs for a UE 115. Such asymmetric uplink versus downlink CCs may be configured based on various parameters, such as an amount of data to be transmitted via the uplink or downlink CCs.

In some examples, the wireless communication system 100 may support operation over a dedicated RF spectrum band (e.g., a RF spectrum band for which transmitting apparatuses may not contend for access because the RF spectrum band is licensed to particular users for particular uses (e.g., a licensed RF spectrum band usable for LTE/LTE-A communications)) or a shared RF spectrum band (e.g., a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner)).

As previously indicated, it may be desirable, in some situations, to adjust one or more parameters for wireless transmissions between a UE 115 and a base station 105. Various techniques described herein enable transmission of a SRS in a shared RF spectrum band or a dedicated RF spectrum band (or any available RF spectrum band). In some examples, two or more uplink CCs may be configured for uplink transmissions from a UE, with at least one of the uplink CCs using a shared RF spectrum band. A UE may identify that the two or more CCs are in a same timing advance group (TAG), and transmit a SRS transmission and a PUSCH/PUCCH transmission during a same uplink symbol (either on the same or a different CC as the SRS transmission). In some examples, a power limited UE may transmit a SRS based on a minimum configured power. In some examples, a channel priority assigned to a CC carrying a SRS transmission in a shared RF spectrum band may be set to a higher channel priority than a channel priority for a similar transmission using a dedicated RF spectrum band. In some examples, a SRS transmission may use a CC that is configured for downlink data transmissions but not uplink data transmissions.

Figure 2:
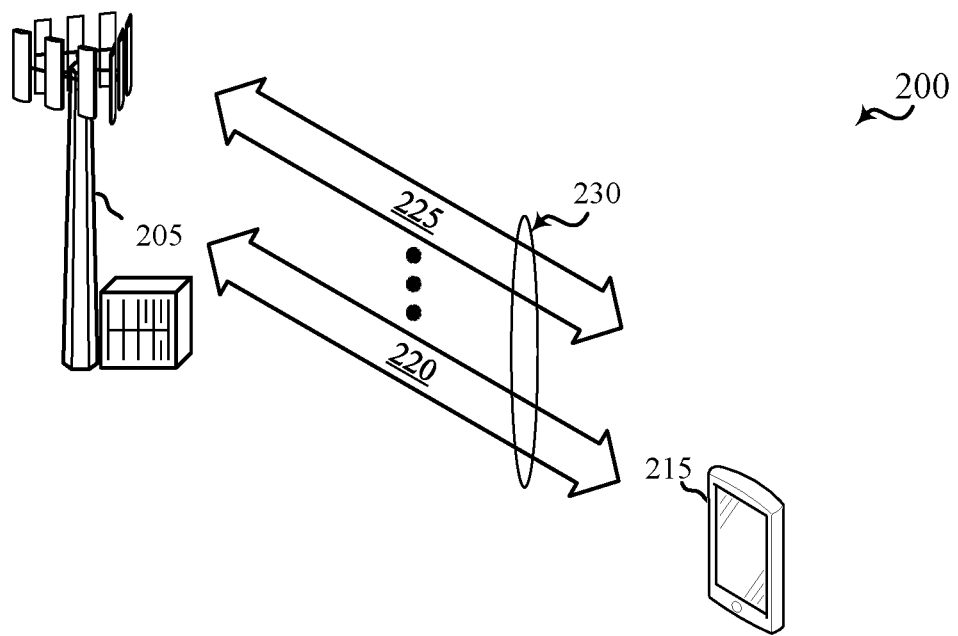
FIG. 2 shows a wireless communication system in which LTE/LTE-A may be deployed under a licensed-assisted access (LAA) carrier aggregation (CA) mode using a shared radio frequency (RF) spectrum band, in accordance with various aspects of the present disclosure.

FIG. 2 illustrates shows a wireless communication system 200 in which LTE/LTE-A may be deployed under a licensed-assisted access (LAA) carrier aggregation (CA) mode using a shared RF spectrum band, in accordance with various aspects of the present disclosure. Wireless communication system 200 may include a base station 205 and UE 215, which may be examples of the corresponding base stations 105 and UEs 115 described with reference to FIG. 1.

In one example of a LAA CA mode in the wireless communication system 200, the base station 205 may transmit OFDMA waveforms to the UE 215 using two or more CCs 230. The two or more CCs may include a first CC 220 and base station 205 may receive OFDMA waveforms, SC-FDMA waveforms, or resource block interleaved FDMA waveforms from the UE 215 using the first CC 220. The first CC 220 may be associated with a frequency in the shared RF spectrum band. The shared RF spectrum band may include a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner). The base station 205 may also transmit OFDMA waveforms to the UE 215 using a second CC 225 and may receive SC-FDMA waveforms from the UE 215 using the second CC 225. The second CC 225 may be associated with a frequency in a dedicated RF spectrum band or in a shared RF spectrum band. The dedicated RF spectrum band may include a RF spectrum band for which transmitting apparatuses may not contend for access (e.g., a RF spectrum band licensed to particular users for particular uses, such as a licensed RF spectrum band usable for LTE/LTE-A communications). The first CC 220 may provide a downlink and uplink capacity offload for the base station 205. This example may occur when a service provider (e.g., a mobile network operator (MNO)) uses a dedicated RF spectrum band and relieves traffic or signaling congestion using a shared RF spectrum band. This example is presented for illustrative purposes and there may be other similar modes of operation or deployment scenarios that combine LTE/LTE-A communication in a dedicated RF spectrum band with LTE/LTE-A communication in a shared RF spectrum band for capacity offload.

As described above, one type of service provider that may benefit from the capacity offload offered by using LTE/LTE-A in a shared RF spectrum band is a traditional MNO having access rights to an LTE/LTE-A dedicated RF spectrum band. For these service providers, an operational example may include a bootstrapped mode that uses a LTE/LTE-A PCC on the dedicated RF spectrum band and at least one SCC on the shared RF spectrum band. In some examples, base station 205 may be deployed in a residential, small business, medium business, or enterprise environment, and may allow UE 215 to establish PCell and SCell connections using shared RF spectrum band(s). Such a deployment may allow UE 215 to operate using shared RF spectrum band and reduce data usage provided to the UE 215 through licensed RF spectrum bands, which may help reduce costs for a user of UE 215 in some cases. Such a deployment may also provide reliability of licensed RF spectrum band, which may be used in the event that unlicensed RF spectrum band(s) are unavailable or provide a relatively poor quality of service. In some examples, base station 205 may include hardware for both licensed spectrum access as well as shared spectrum access. Such deployments thus may provide PCell and SCell connections using shared RF spectrum band(s), which may provide some advantages of LAA communications (e.g., higher supported data rates than Wi-Fi alone, and more flexible multicarrier listen before talk (LBT) than Wi-Fi) for radio access technologies (RATs) in which the RAT standards may not provide for stand-alone operation using a shared RF spectrum bands. In other examples, different base stations may provide one or more CCs to UE 215.

In the LAA CA mode, data and control signals may, for example, be communicated in the dedicated RF spectrum band (e.g., via the second CC 225) while data may, for example, be communicated in the shared RF spectrum band (e.g., via the first CC 220). Alternatively, control signals may also be communicated in the shared RF spectrum band. In some examples, the carrier aggregation mechanisms supported when using a shared RF spectrum band may fall under a hybrid frequency division duplexing-time division duplexing (FDD-TDD) carrier aggregation or a TDD-TDD carrier aggregation with different symmetry across component carriers.

In some examples that employ a LAA CA mode, CCs 230 may be configured into one or more timing advance groups (TAGs), which may provide different CCs 230 with different timing advances for UL/DL transmissions. As mentioned above, in existing LTE/LTE-A deployments, a UE 215 configured with a single TAG is supposed to drop SRS transmission whenever SRS and PUSCH/PUCCH transmissions overlap in the same symbol within the same carrier or across different carriers. For a UE 215 configured with multiple TAGs, different rules may apply in existing deployments, which provide that if SRS is scheduled on one CC and PUSCH/PUCCH is scheduled on a different CC, a UE 215 may transmit SRS if the UE 215 is not power limited. If the UE 215 is power limited, the SRS transmission in such deployments is dropped. If an SRS transmission overlaps with another SRS transmission on another CC and the UE 215 is not power limited, the SRS transmissions may be transmitted according to regular power level configurations for such transmissions. If the UE 215 is power limited in such deployments, the UE 215 may scale the transmission power for the different transmissions such that a maximum power ($P_{cmax}$) is not exceeded. Such dropping of SRS transmissions, if such techniques are implemented using shared RF spectrum band, may result in excessive dropping of SRS transmissions, particularly when coupled with contention-based channel access associated with a shared RF spectrum band. In some deployments, channel reciprocity based downlink operation may be relatively important aspect and once the uplink channel is cleared it may be desirable to avoid dropping of SRS, if possible, in order to provide efficient downlink operation.

According to various aspects of the present disclosure, SRS transmissions in deployments using a shared RF spectrum band may be provided that provide enhanced opportunities for SRS transmissions. In some examples, SRS transmissions may be enhanced to cover a relatively large system bandwidth to exploit the power spectral density limit on transmission bandwidths for improved SRS coverage/accuracy. Additionally or alternatively, SRS may be transmitted on uplink carriers that are not configured for uplink CA operations, but are configured for downlink CA operations. For example, a UE (e.g., UE 215) may be configured with three downlink CCs for downlink CA, but only the first two CCs are configured for uplink CA. The third CC thus has no UL control or data transmission by the UE. However, SRS may still be transmitted on the third CC by the UE to facilitate channel reciprocity based DL operation. In some examples, SRS transmissions may further be enhanced by configuring the UE with at least one uplink CC in a shared RF spectrum band to have multiple TAGs, such that SRS is not dropped even if it collides with PUCCH/PUSCH of a different CC, if the UE is not power limited. In some cases, however, it may not be desirable to maintain multiple TAGs for a set of CCs (e.g., due to increased processing overhead, etc.), and various examples provide that a single TAG may be configured for a set of CCs and SRS may be transmitted even in the event that the SRS collides with a PUCCH/PUSCH transmission. Such SRS transmission techniques may be applied to both regular subframes as well as special subframes in which SRS may be transmitted in an uplink pilot time slot (UpPTS) of a special subframe (which may provide one or more SRS symbols).

Additionally or alternatively, some examples may provide a minimum guaranteed power for uplink CCs in a shared RF spectrum band. In some cases, different power amplifiers at the UE 215 may be used for uplink CCs in dedicated RF spectrum and for uplink CCs in a shared RF spectrum band. Such a minimum guaranteed power may help provide some uplink transmissions, following a successful channel contention by the UE 215 in the shared RF spectrum band in the event that the UE 215 becomes power limited. In some examples, a SRS transmission using the shared RF spectrum band may be provided with a different priority (e.g., higher priority) than the same type of channel transmitted in the dedicated RF spectrum band.

Figure 3:
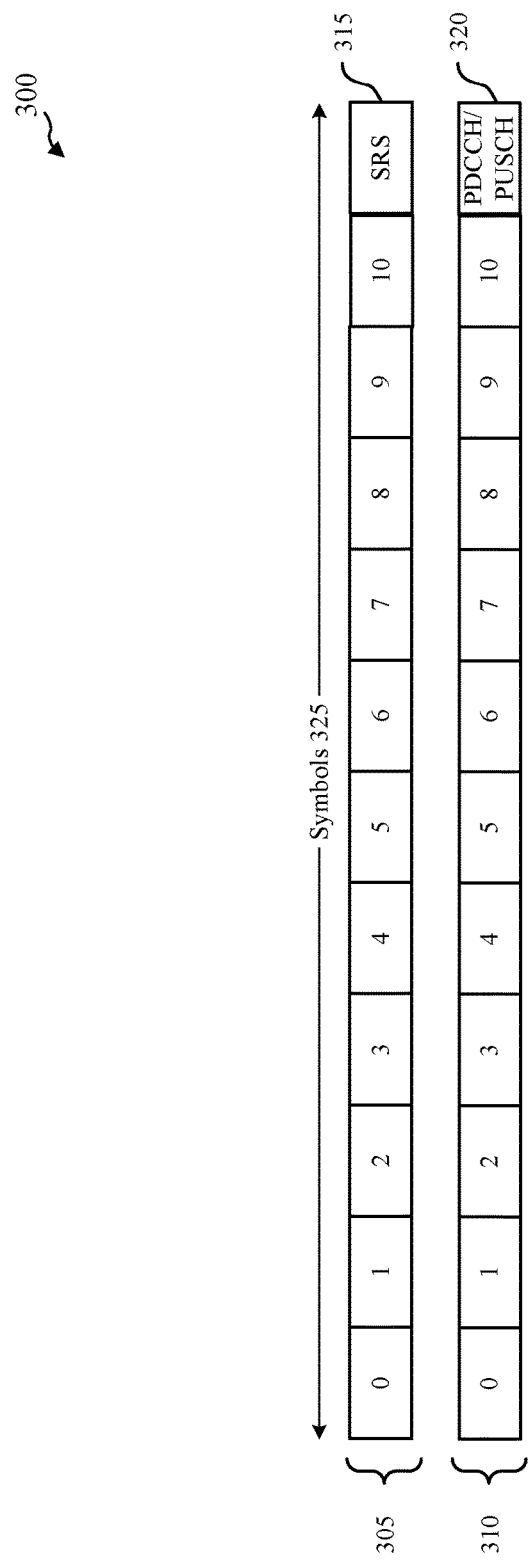
FIG. 3 shows an example of resources of first component carrier (CC) for transmission of a sounding reference signal (SRS) and a second CC for transmission of a physical uplink control channel (PUCCH) or physical uplink shared channel (PUSCH) transmission, in accordance with various aspects of the present disclosure.

As discussed above, in some examples a UE operating using a shared RF spectrum band for one or more CCs may transmit SRS using techniques that may reduce the likelihood of dropping SRS transmissions in the event of a collision between SRS and PUCCH/PUSCH transmissions. FIG. 3 shows an example 300 of resources of a first CC 305 for transmission of a SRS 315 and a second CC 310 for transmission of a PUCCH or PUSCH transmission 320, in accordance with various aspects of the present disclosure. The first CC 305 and second CC 310 may be transmitted by a device such as one of the UEs 115 or 215 described with reference to FIG. 1 or 2, which may be configured for such transmissions by another device such as one of the base stations 105 described with reference to FIG. 1 or 2. In some examples, the first CC 305 and the second CC 310 may each include a number of uplink symbols 325 which may be transmitted, for example, in a subframe of a radio frame. A period of time for uplink or downlink transmissions may be referred to as a transmission time interval (TTI) which may correspond to a radio frame duration (e.g., 10 ms), a radio subframe duration (e.g., 1 ms), or some other time period.

In some examples, a UE (e.g., UE 115 or UE 215 of FIG. 1 or 2) may establish wireless communications using first uplink CC 305 and second uplink CC 310, or additional uplink CCs. At least one of the first uplink CC 305 or second uplink CC 310 (or another uplink CC) uses a shared RF spectrum band, and one or more of the first uplink CC 305 or second uplink CC may use a dedicated RF spectrum band. Each of the CCs 305 and 310 may be configured to be in a same TAG, and the UE may identify that the SRS transmission 315 is scheduled for transmission in the first CC 305, and also may determine that the SRS transmission 315 is in a same symbol as PUCCH/PUSCH transmission 320. Although PUCCH/PUSCH transmission 320 is illustrated as being in a different CC as SRS transmission 315, in other examples PUCCH/PUSCH and SRS transmissions may collide in a same symbol of a same CC. According to some examples, the UE may transmit the SRS 315 using the first uplink CC 305 and the PUCCH/PUSCH transmission 320 using the second uplink CC 310. In some examples, the UE may further determine that uplink transmissions during the symbol containing SRS 315 and PUCCH/PUSCH transmission 320 are not power limited, and may transmit the SRS 315 according to regular power level configurations. In other examples, the UE may determine that the uplink transmissions are power limited, in which case the UE may either drop the SRS transmission or, according to some examples, proceed to transmit the SRS 315 based on a minimum power level configured for transmission of the first CC. In some examples, the first CC 305 may be transmitted over the shared RF spectrum band using a channel priority that is different than a channel priority that would be provided for the first CC 305 if it were transmitted over a dedicated RF spectrum band. In some further examples, the SRS 315 may be configured to occupy resource elements (REs) that span a frequency bandwidth of the shared RF spectrum band used for the first CC 305, with RE locations of the SRS 315 determined based at least in part on a power spectral density limit of the frequency bandwidth.

Figure 4:
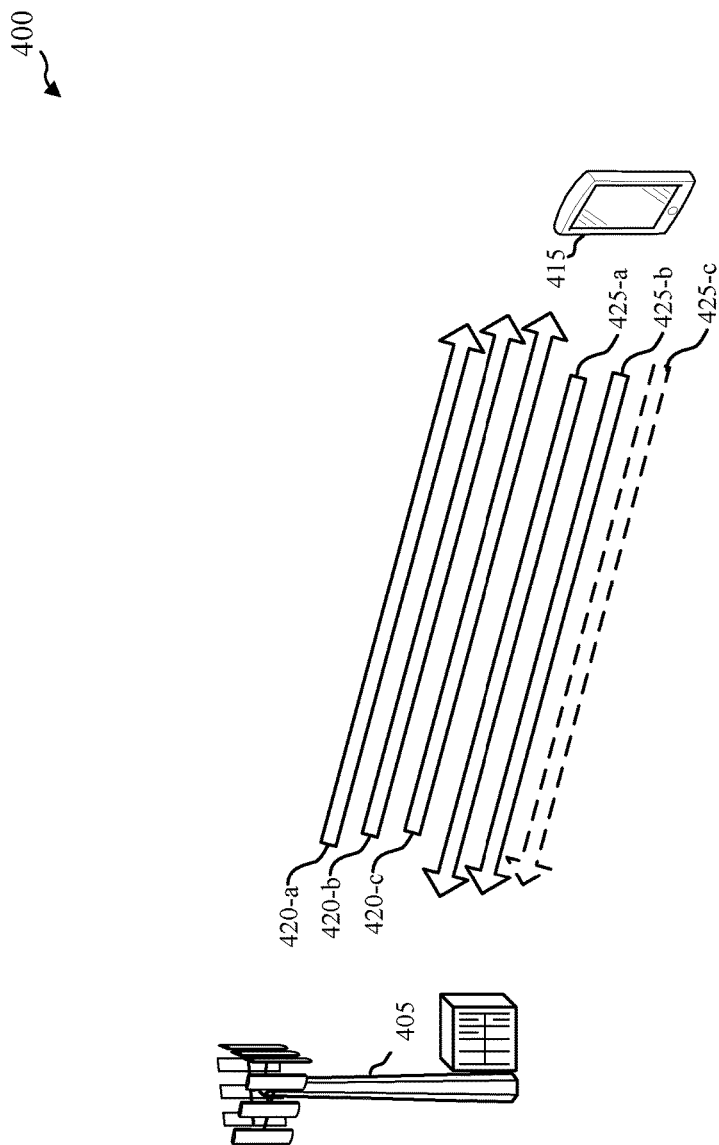
FIG. 4 shows a wireless communication system in which a SRS is transmitted using a CC configured for downlink transmissions and not configured for uplink PUSCH transmissions, in accordance with various aspects of the present disclosure.

Also as discussed above, in some examples a number of uplink CCs may be different than a number of downlink CCs. FIG. 4 shows a wireless communication system 400 in which a SRS is transmitted using a CC configured for downlink transmissions and not configured for uplink PUSCH transmissions, in accordance with various aspects of the present disclosure. Wireless communications system 400 may include a base station 405 and UE 415, which may be examples of the corresponding base stations 105 or 205 and UEs 115 or 215 described with reference to FIG. 1 or 2.

In the example, of FIG. 4, a set of downlink CCs 420 may be configured for downlink CA operations, and may include a first downlink CC 420-*a*, a second downlink CC 420-*b*, and a third downlink CC 420-*c*. The downlink CCs 420 may be transmitted using a dedicated RF spectrum band, or a shared RF spectrum band. A number of uplink CCs 425 also may be configured for uplink CA operations, and may include a configured first uplink CC 425-*a* and a second configured uplink CC 425-*b*. Thus, in this example the set of downlink CCs 420 may include a different number of CCs than the configured uplink CCs 425. The uplink CCs 425 may correspond to a subset of the set of downlink CCs 420, and the number of downlink CCs 420 and uplink CCs 425 may be configured for one or more TTIs and may be adjusted for different TTIs based on uplink and downlink data to be transmitted at a particular point in time. Thus, the set of uplink CCs 425 may be different than the set of downlink CCs 420, with the set of uplink CCs 425 containing fewer configured CCs than the set of downlink CCs 420. In the example of FIG. 4, UE 415 may transmit a SRS transmission using a third uplink CC 425-*c*, which is not configured for uplink CA transmissions and is outside of the set of uplink CCs 425 configured for CA operations.

Figure 5:
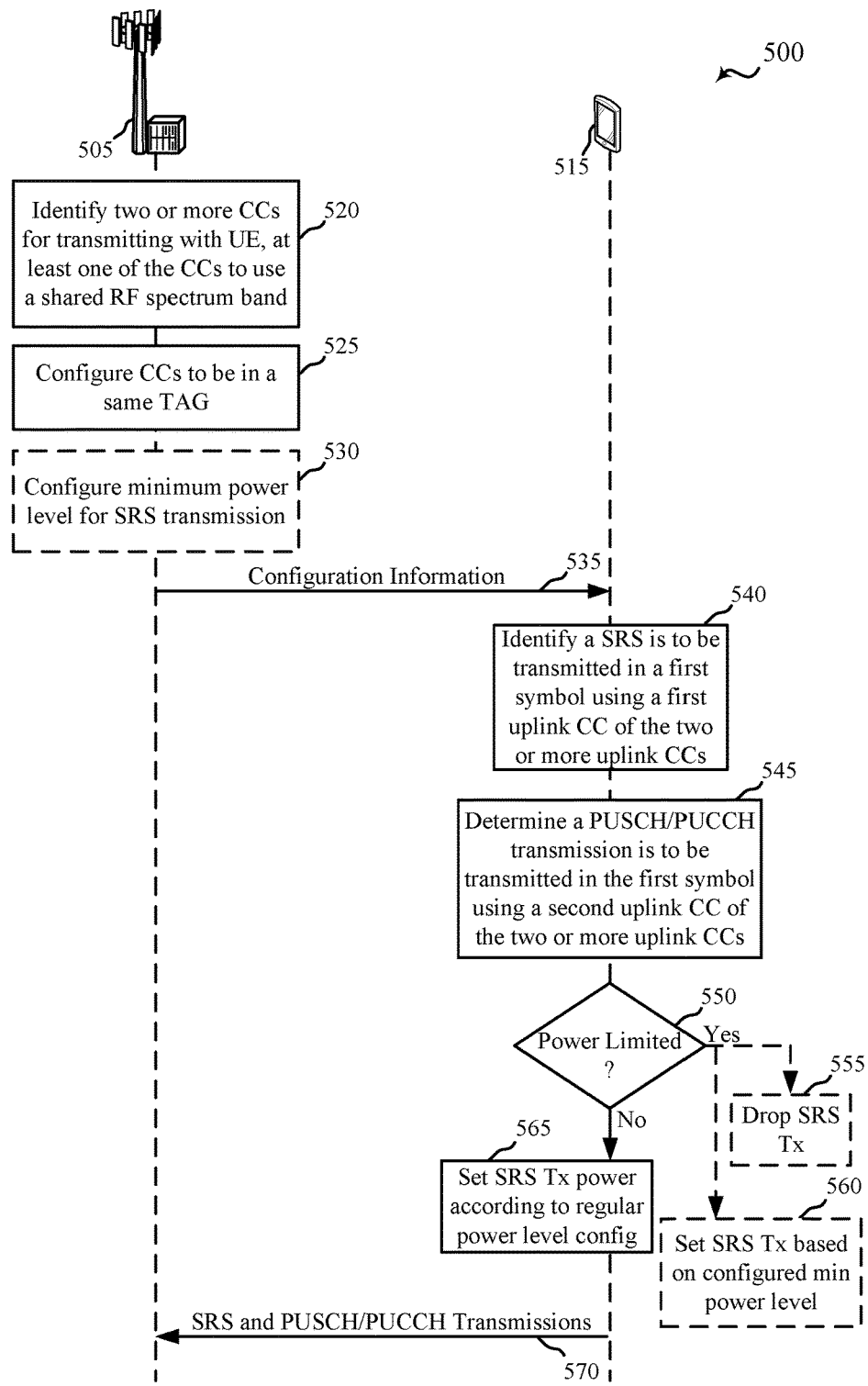
FIG. 5 shows a message flow in which a UE may transmit a SRS in a shared RF spectrum band, in accordance with various aspects of the present disclosure.

FIG. 5 shows a message flow 500 in which a UE 515 may transmit a SRS in a shared RF spectrum band, in accordance with various aspects of the present disclosure. The messages may be transmitted between base station 505, and UE 515 using two or more CCs such as discussed above. The base station 505 may be an example of aspects of the base station 105, 205, or 405 described with reference to FIG. 1, 2, or 4, and the UE 515 may be an example of aspects of the UEs 115, 215, or 415 described with reference to FIG. 1, 2, or 4.

At block 520, the base station 505 may identify two or more CCs for transmitting with UE, at least one of the CCs to use a shared RF spectrum band. Such CCs may be identified based on CA and LAA configurations of the base station 505 and UE 515, and may include one or more uplink CCs and one or more downlink CCs, as discussed above. At block 525, the base station 505 may configure the uplink CCs to be in a same TAG, similarly as discussed above. At optional block 530, the base station 505 may configure a minimum power level for SRS transmissions, similarly as discussed above. For example, if SRS transmissions are to be transmitted using an uplink CC in a shared RF spectrum band, the base station 505 may configure a minimum power level for SRS transmissions using the uplink CC that may be used by the UE 515 in the event that the UE 515 is power limited during the transmission of the SRS. The base station 505 may transmit configuration information 535 to the UE 515, which receive the configuration information and configure CA operations using the shared RF spectrum band according to the received configuration information.

At block 540, the UE 515 may identify that a SRS is to be transmitted in a first symbol using a first uplink CC of the two or more uplink CCs. Such an identification may be made according to a time period for periodic SRS transmission, or aperiodic SRS transmission parameters, for example. At block 545, the UE 515 may determine a PUSCH/PUCCH transmission is to be transmitted in the first symbol using a second uplink CC of the two or more uplink CCs. Thus, the PUSCH/PUCCH transmission and the SRS transmission collide during the first symbol. At block 550, the UE 515 may determine if transmissions during the first symbol are power limited. If the transmissions are power limited, the UE 515 may optionally drop the SRS transmission, as indicated at block 555, or in some examples may optionally set the SRS transmission based on a minimum configured power level as indicated at block 560. At block 565, if it is determined that the transmission of the first symbol is not power limited, the UE may set SRS transmission power according to regular power level configurations. The UE 515 may then transmit SRS and PUSCH/PUCCH transmissions 570 to the base station 505.

Figure 6:
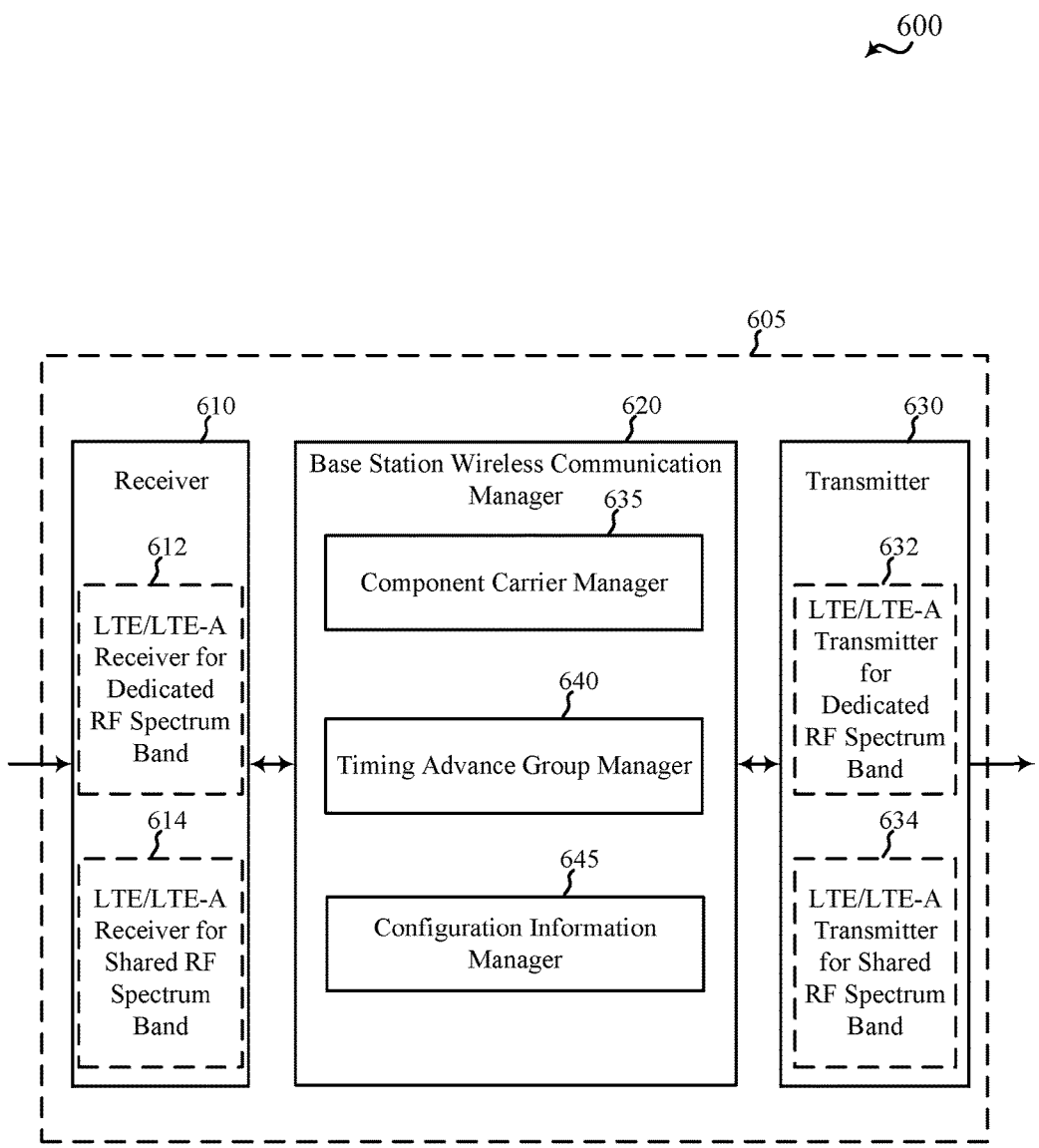
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, 405, or 505 described with reference to FIG. 1, 2, 4 or 5. The apparatus 605 may also be or include a processor. The apparatus 605 may include a receiver 610, a base station wireless communication manager 620, or a transmitter 630. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, field-programmable gate arrays (FPGAs), a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver, such as at least one RF receiver operable to receive transmissions over a dedicated RF spectrum band (e.g., a RF spectrum band for which transmitting apparatuses may not contend for access because the RF spectrum band is licensed to particular users for particular uses) or a shared RF spectrum band (e.g., a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner)). In some examples, the dedicated RF spectrum band or the shared RF spectrum band may be used for LTE/LTE-A communications, as described, for example, with reference to FIG. 1, 2, 3, 4, or 5. The receiver 610 may in some cases include separate receivers for the dedicated RF spectrum band and the shared RF spectrum band. The separate receivers may, in some examples, take the form of an LTE/LTE-A receiver for communicating over the dedicated RF spectrum band (e.g., LTE/LTE-A receiver for dedicated RF spectrum band 612), and an LTE/LTE-A receiver for communicating over the shared RF spectrum band (e.g., LTE/LTE-A receiver for shared RF spectrum band 614). The receiver 610, including the LTE/LTE-A receiver for dedicated RF spectrum band 612 or the LTE/LTE-A receiver for shared RF spectrum band 614, may be used to receive various types of data or control signals (i.e., transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the transmitter 630 may include at least one RF transmitter, such as at least one RF transmitter operable to transmit over the dedicated RF spectrum band or the shared RF spectrum band. The transmitter 630 may in some cases include separate transmitters for the dedicated RF spectrum band and the shared RF spectrum band. The separate transmitters may, in some examples, take the form of an LTE/LTE-A transmitter for communicating over the dedicated RF spectrum band (e.g., LTE/LTE-A transmitter for dedicated RF spectrum band 632), and an LTE/LTE-A transmitter for communicating over the shared RF spectrum band (e.g., LTE/LTE-A transmitter for shared RF spectrum band 634). The transmitter 630, including the LTE/LTE-A transmitter for dedicated RF spectrum band 632 or the LTE/LTE-A transmitter for shared RF spectrum band 634, may be used to transmit various types of data or control signals (i.e., "data" or transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the base station wireless communication manager 620 may be used to manage one or more aspects of wireless communication for the apparatus 605. In some examples, part of the base station wireless communication manager 620 may be incorporated into or shared with the receiver 610 or the transmitter 630. In some examples, the base station wireless communication manager 620 may include a component carrier manager 635, a timing advance group manager 640, and a configuration information manager 645.

In some examples, the component carrier manager 635 may be used to configure wireless communications at a UE (e.g., a UE 115, 215, 415, or 515 of FIG. 1, 2, 4, or 5) using two or more uplink CCs in a wireless communications network, at least one of the two or more uplink CCs using a shared RF spectrum band, as discussed above with respect to FIGS. 1 through 5. In some examples, the transmitter 630 may, in conjunction with component carrier manager 635, transmit configuration information to the UE for configuring CCs for uplink transmissions. The timing advance group manager 640 may be used to configure each of the two or more uplink CCs to be in a same TAG, as discussed above with respect to FIGS. 1 through 5.

The configuration information manager 645 may determine configuration information based at least in part on the component carrier configuration and the TAG configuration, and may configure a SRS to be transmitted in a first symbol using a first uplink CC of the two or more uplink CCs concurrently with one or more of a PUSCH transmission or a PUCCH transmission to be transmitted during the first symbol using a second uplink CC of the two or more uplink CCs. In some examples, the configuration information manager 645 may configure the SRS to be transmitted during a regular uplink subframe of a radio frame, or during a special subframe of a radio frame (e.g., during an uplink pilot time slot (UpPTS) of the special subframe).

Figure 7:
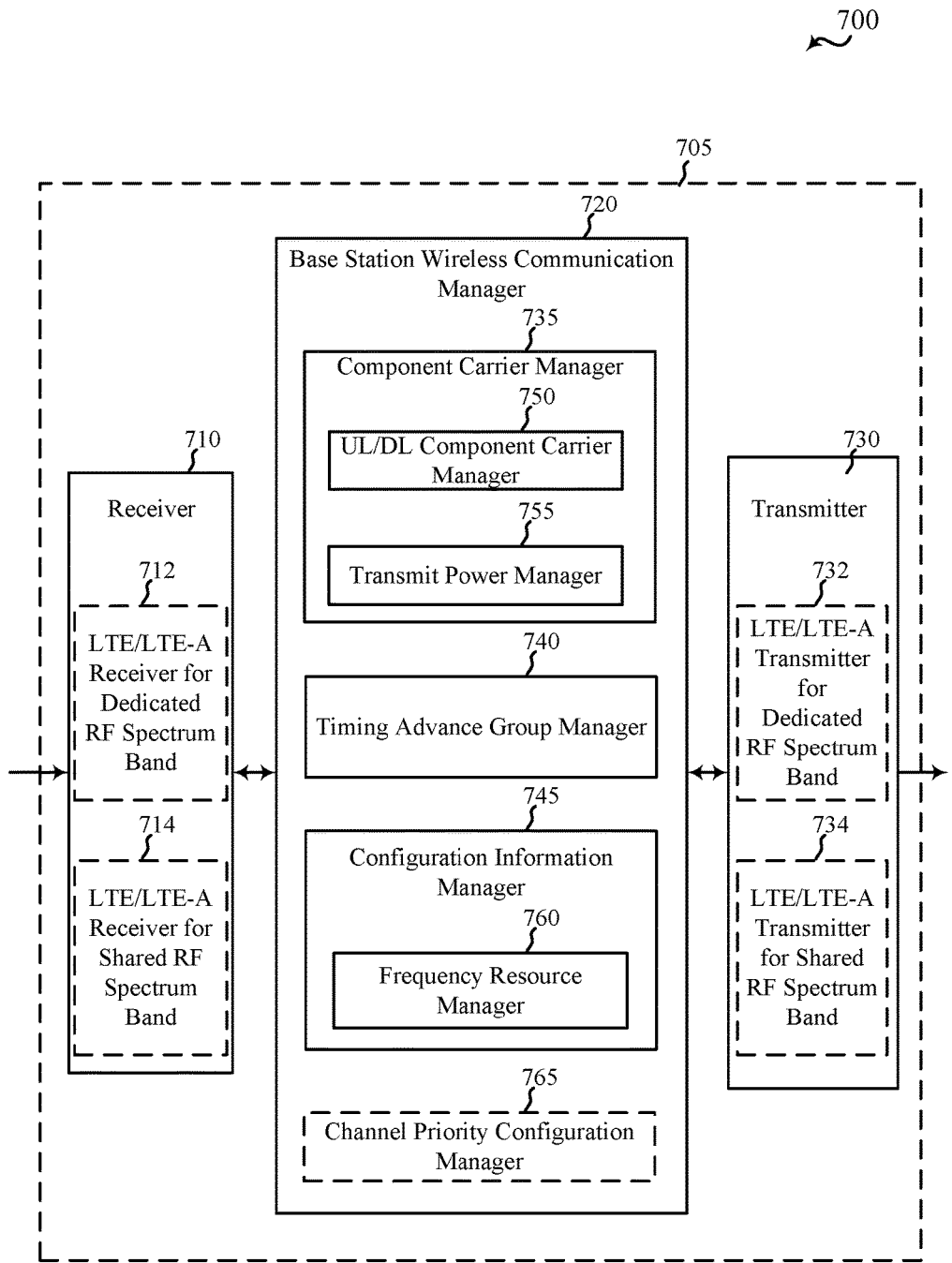
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, 405, or 505 described with reference to FIG. 1, 2, 4 or 5, or aspects of the apparatus 605 described with reference to FIG. 6. The apparatus 705 may also be or include a processor. The apparatus 705 may include a receiver 710, a base station wireless communication manager 720, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a dedicated RF spectrum band (e.g., a RF spectrum band for which transmitting apparatuses may not contend for access because the RF spectrum band is licensed to particular users for particular uses) or a shared RF spectrum band (e.g., a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner)). In some examples, the dedicated RF spectrum band or the shared RF spectrum band may be used for LTE/LTE-A communications, as described, for example, with reference to FIG. 1, 2, 3, 4, or 5. The receiver 710 may in some cases include separate receivers for the dedicated RF spectrum band and the shared RF spectrum band. The separate receivers may, in some examples, take the form of an LTE/LTE-A receiver for communicating over the dedicated RF spectrum band (e.g., LTE/LTE-A receiver for dedicated RF spectrum band 712), and an LTE/LTE-A receiver for communicating over the shared RF spectrum band (e.g., LTE/LTE-A receiver for shared RF spectrum band 714). The receiver 710, including the LTE/LTE-A receiver for dedicated RF spectrum band 712 or the LTE/LTE-A receiver for shared RF spectrum band 714, may be used to receive various types of data or control signals (i.e., transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the transmitter 730 may include at least one RF transmitter, such as at least one RF transmitter operable to transmit over the dedicated RF spectrum band or the shared RF spectrum band. The transmitter 730 may in some cases include separate transmitters for the dedicated RF spectrum band and the shared RF spectrum band. The separate transmitters may, in some examples, take the form of an LTE/LTE-A transmitter for communicating over the dedicated RF spectrum band (e.g., LTE/LTE-A transmitter for dedicated RF spectrum band 732), and an LTE/LTE-A transmitter for communicating over the shared RF spectrum band (e.g., LTE/LTE-A transmitter for shared RF spectrum band 734). The transmitter 730, including the LTE/LTE-A transmitter for dedicated RF spectrum band 732 or the LTE/LTE-A transmitter for shared RF spectrum band 734, may be used to transmit various types of data or control signals (i.e., "data" or transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the base station wireless communication manager 720 may be used to manage one or more aspects of wireless communication for the apparatus 705. In some examples, part of the base station wireless communication manager 720 may be incorporated into or shared with the receiver 710 or the transmitter 730. In some examples, the base station wireless communication manager 720 may include a component carrier manager 735, a timing advance group manager 740, and a configuration information manager 745. In some examples, the base station wireless communication manager 720 may also include optional channel priority configuration manager 765.

The component carrier manager 735 may be an example of component carrier manager 635 of FIG. 6, and also may include a UL/DL component carrier manager 750, and transmit power manager 755. In some examples, the UL/DL component carrier manager 750 may manage CA configuration of UEs configure sets of uplink CCs and sets of downlink CCs for the UEs. In some examples, the UL/DL component carrier manager 750 may allocate a first set of uplink CCs that includes the two or more uplink CCs for uplink transmissions during a transmission time interval (TTI), and manage transmitting downlink transmissions using a second set of downlink CCs that includes different CCs than the first set of uplink CCs. In some examples, the configuration information manager 745 may configure the SRS to be transmitted using a CC of the second set of downlink CCs that is outside of the first set of uplink CCs. In some examples, the first CC and the second CC are different CCs.

The transmit power manager 755 may, in some examples, configure the SRS transmission based on a minimum transmission power level that is to be used when the SRS transmission during the first symbol using the two or more uplink CCs is power limited, as discussed above with respect to FIGS. 1 through 5. The timing advance group manager 740 may be an example of timing advance group manager 640 of FIG. 6, and may perform operations as discussed above with respect to FIG. 6.

The configuration information manager 745 may be an example of configuration information manager 645 of FIG. 6, and also may include a frequency resource manager 760. In some examples, the frequency resource manager 760 may configure the SRS to span a frequency bandwidth of the first symbol, as discussed above with respect to FIGS. 1 through 5. For example, the frequency bandwidth for the SRS may be configured based at least in part on a power spectral density limit of the frequency bandwidth.

In some examples, the optional channel priority configuration manager 765 may configure the first uplink CC to be transmitted over the shared RF spectrum band using a channel priority that is different than a channel priority for transmitting the second CC to be transmitted over a dedicated RF spectrum band.

Figure 8:
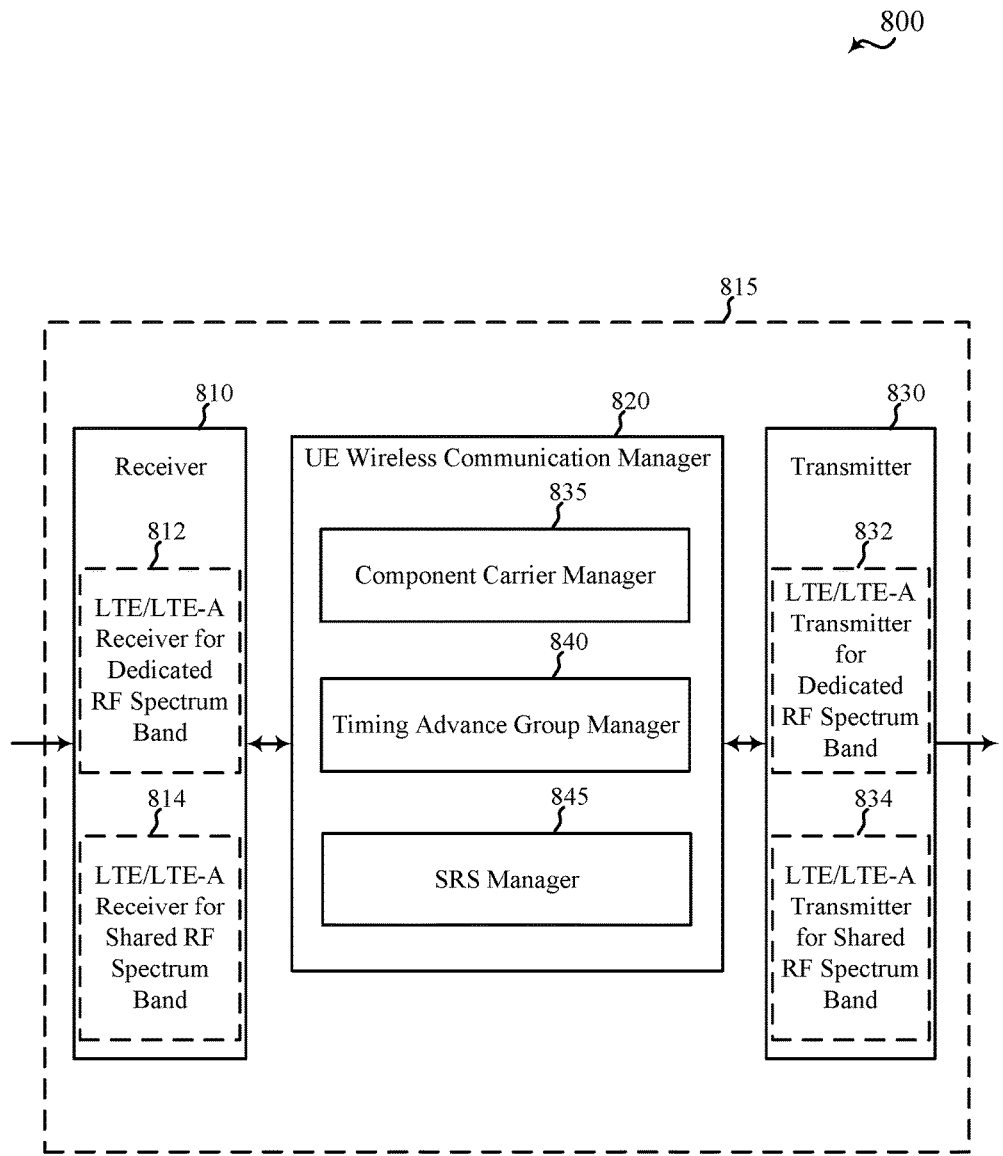
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 415, or 515 described with reference to FIG. 1, 2, 4, or 5. The apparatus 815 may also be or include a processor. The apparatus 815 may include a receiver 810, a UE wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated RF spectrum band (e.g., a RF spectrum band for which transmitting apparatuses may not contend for access because the RF spectrum band is licensed to particular users for particular uses) or a shared RF spectrum band (e.g., a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner)). In some examples, the dedicated RF spectrum band or the shared RF spectrum band may be used for LTE/LTE-A communications, as described, for example, with reference to FIG. 1, 2, 3, 4, or 5. The receiver 810 may in some cases include separate receivers for the dedicated RF spectrum band and the shared RF spectrum band. The separate receivers may, in some examples, take the form of an LTE/LTE-A receiver for communicating over the dedicated RF spectrum band (e.g., LTE/LTE-A receiver for dedicated RF spectrum band 812), and an LTE/LTE-A receiver for communicating over the shared RF spectrum band (e.g., LTE/LTE-A receiver for shared RF spectrum band 814). The receiver 810, including the LTE/LTE-A receiver for dedicated RF spectrum band 812 or the LTE/LTE-A receiver for shared RF spectrum band 814, may be used to receive various types of data or control signals (i.e., "data" or transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the transmitter 830 may include at least one RF transmitter, such as at least one RF transmitter operable to transmit over the dedicated RF spectrum band or the shared RF spectrum band. The transmitter 830 may in some cases include separate transmitters for the dedicated RF spectrum band and the shared RF spectrum band. The separate transmitters may, in some examples, take the form of an LTE/LTE-A transmitter for communicating over the dedicated RF spectrum band (e.g., LTE/LTE-A transmitter for dedicated RF spectrum band 832), and an LTE/LTE-A transmitter for communicating over the shared RF spectrum band (e.g., LTE/LTE-A transmitter for shared RF spectrum band 834). The transmitter 830, including the LTE/LTE-A transmitter for dedicated RF spectrum band 832 or the LTE/LTE-A transmitter for shared RF spectrum band 834, may be used to transmit various types of data or control signals (i.e., "data" or transmissions) over one or more communication links of a wireless communication system, such as one or more communication links of the wireless communication system 100, 200, or 400 described with reference to FIG. 1, 2, or 4. The communication links may be established over the dedicated RF spectrum band or the shared RF spectrum band.

In some examples, the UE wireless communication manager 820 may be used to manage one or more aspects of wireless communication for the apparatus 815. In some examples, part of the UE wireless communication manager 820 may be incorporated into or shared with the receiver 810 or the transmitter 830. In some examples, the UE wireless communication manager 820 may include component carrier manager 835, a timing advance group manager 840 or SRS manager 845.

The component carrier manager 835 may be used to establish wireless communications using two or more uplink CCs in a wireless communications network, at least one of the two or more uplink CCs using a shared RF spectrum band, as discussed above with respect to FIGS. 1 through 5. In some examples, the first uplink CC may be part of the shared RF spectrum band. In other examples, the first uplink CC is not part of the shared RF spectrum band. The timing advance group manager 840 may be used to identify that each of the two or more uplink CCs are configured to be in a same TAG.

The SRS manager 845 may be used to identify a SRS to be transmitted in a first symbol using a first uplink CC of the two or more uplink CCs, determining that one or more of a PUSCH transmission or a PUCCH transmission is to be transmitted in the first symbol using a second uplink CC of the two or more uplink CCs, and in conjunction with transmitter 830, may transmit, in the first symbol, the SRS using the first uplink CC and one or more of the PUSCH or PUCCH using the second uplink CC. In some examples, the SRS may be transmitted during a regular uplink subframe of a radio frame. In other examples, the SRS may be transmitted during a special subframe of a radio frame (e.g., in two or more SRS symbols during a UpPTS of the special subframe).

Figure 9:
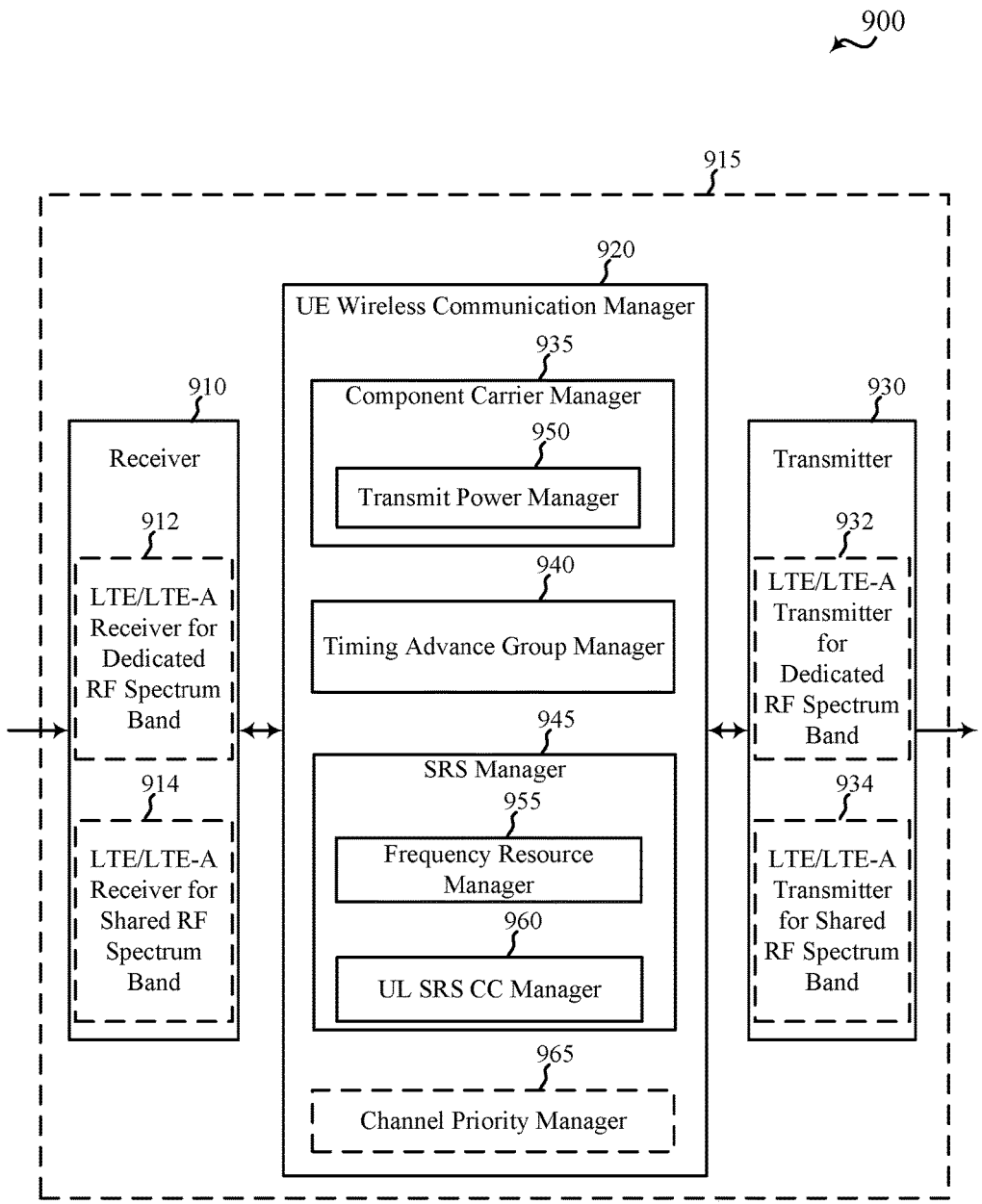
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 415, or 515 described with reference to FIG. 1, 2, 4, or 5, or aspects of the apparatus 815 described with reference to FIG. 8. The apparatus 915 may also be or include a processor. The apparatus 915 may include a receiver 910, a UE wireless communication manager 920, or a transmitter 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated RF spectrum band (e.g., a RF spectrum band for which transmitting apparatuses may not contend for access because the RF spectrum band is licensed to particular users for particular uses) or a shared RF spectrum band (e.g., a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner)). In some examples, the dedicated RF spectrum band or the shared RF spectrum band may be used for LTE/LTE-A communications, as described, for example, with reference to FIG. 1, 2, 3, 4, or 5. The receiver 910 may in some cases include separate receivers for the dedicated RF spectrum band and the shared RF spectrum band. The separate receivers may, in some examples, take the form of an LTE/LTE-A receiver for communicating over the dedicated RF spectrum band (e.g., LTE/LTE-A receiver for dedicated RF spectrum band 912), and an LTE/LTE-A receiver for communicating over the shared RF spectrum band (e.g., LTE/LTE-A receiver for shared RF spectrum band 914). The receiver 910, including the LTE/LTE-A receiver for dedicated RF spectrum band 912 or the LTE/LTE-A receiver for shared RF spectrum band 914, may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the transmitter 930 may include at least one RF transmitter, such as at least one RF transmitter operable to transmit over the dedicated RF spectrum band or the shared RF spectrum band. The transmitter 930 may in some cases include separate transmitters for the dedicated RF spectrum band and the shared RF spectrum band. The separate transmitters may, in some examples, take the form of an LTE/LTE-A transmitter for communicating over the dedicated RF spectrum band (e.g., LTE/LTE-A transmitter for dedicated RF spectrum band 932), and an LTE/LTE-A transmitter for communicating over the shared RF spectrum band (e.g., LTE/LTE-A transmitter for shared RF spectrum band 934). The transmitter 930, including the LTE/LTE-A transmitter for dedicated RF spectrum band 932 or the LTE/LTE-A transmitter for shared RF spectrum band 934, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the UE wireless communication manager 920 may be used to manage one or more aspects of wireless communication for the apparatus 915. In some examples, part of the UE wireless communication manager 920 may be incorporated into or shared with the receiver 910 or the transmitter 930. In some examples, the UE wireless communication manager 920 may include component carrier manager 935, a timing advance group manager 940 or SRS manager 945. The UE wireless communication manager 920 may also include, in some examples, an optional channel priority manager 965.

The component carrier manager 935 may be an example of component carrier manager 835 of FIG. 8, and also may include a transmit power manager 950. In some examples, the transmit power manager 950 may determine that a transmission during the first symbol using the two or more uplink CCs is not power limited, and may provide for transmit power of the SRS using regular power level configuration techniques. In some examples, the transmit power manager 950 may determine that the transmission during the first symbol using the two or more uplink CCs is power limited, and may drop the transmission of the SRS. In other examples, the transmit power manager 950 may determine that the transmission during the first symbol using the two or more uplink CCs is power limited, and transmit of the SRS based on a minimum power level configured for transmission of the first CC. The timing advance group manager 940 may be an example of timing advance group manager 840 of FIG. 8, and may perform similar functions.

The SRS manager 945 may be an example of SRS manager 845 of FIG. 8, and may perform similar functions. In some examples, SRS manager 945 may include a frequency resource manager 955 or a UL SRS CC manager 960. The frequency resource manager 955 may, in some examples, format the SRS to span a frequency bandwidth of the first symbol. Such formatting may be, for example, based at least in part on a power spectral density limit of the frequency bandwidth.

The UL SRS CC manager may, in some examples, determine that the two or more uplink CCs comprise a first set of uplink CCs that are allocated for uplink transmissions during a TTI and may, in conjunction with transmitter 930, transmit one or more of the PUCCH transmission or PUSCH transmission using the first set of uplink CCs, and transmitting the SRS using a different uplink CC that is outside of the first set of uplink CCs. In some examples, the different uplink CC is a CC associated with a second set of downlink CCs, and the first set of uplink CCs comprises fewer CCs than the second set of downlink CCs. In some examples, the first CC and the second CC are different CCs.

The optional channel priority manager 965 may, in some examples, transmit the SRS using the first CC over the shared RF spectrum band using a channel priority that is different than a channel priority for transmitting the SRS using a CC over a dedicated RF spectrum band.

Figure 10:
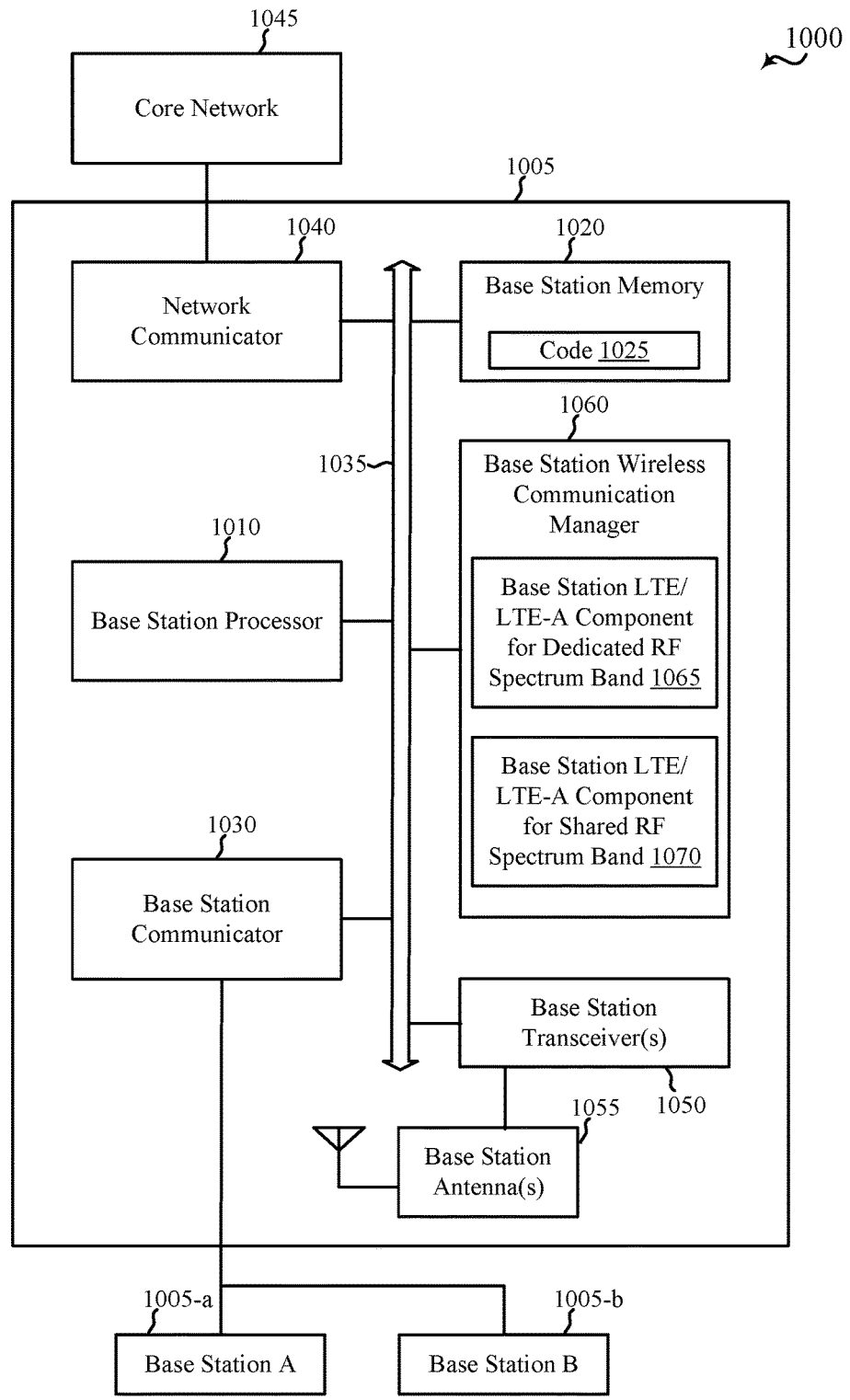
FIG. 10 shows a block diagram of a base station (e.g., a base station forming part or all of an eNB) for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of one or more aspects of the base stations 105, 205, 405, or 505 described with reference to FIG. 1, 2, 4, or 5, or aspects of one or more of the apparatuses 605 or 705 described with reference to FIG. 6 or 7. The base station 1005 may be configured to implement or facilitate at least some of the base station techniques and functions described with reference to FIG. 1, 2, 3, 4, 5, 6, or 7.

The base station 1005 may include a base station processor 1010, a base station memory 1020, at least one base station transceiver (represented by base station transceiver(s) 1050), at least one base station antenna (represented by base station antenna(s) 1055), or a base station wireless communication manager 1060. The base station 1005 may also include one or more of a base station communicator 1030 or a network communicator 1040. Each of these components may be in communication with each other, directly or indirectly, over one or more buses 1035.

The base station memory 1020 may include random access memory (RAM) or read-only memory (ROM). The base station memory 1020 may store computer-readable, computer-executable code 1025 containing instructions that are configured to, when executed, cause the base station processor 1010 to perform various functions described herein related to wireless communication, including, for example, configuring UEs for transmission of SRS in a shared RF spectrum band or a dedicated RF spectrum band and receiving such transmitted SRS transmissions. Alternatively, the computer-executable code 1025 may not be directly executable by the base station processor 1010 but be configured to cause the base station 1005 (e.g., when compiled and executed) to perform various of the functions described herein.

The base station processor 1010 may include an intelligent hardware device, e.g., a central processing unit (CPU), a microcontroller, an ASIC, etc. The base station processor 1010 may process information received through the base station transceiver(s) 1050, the base station communicator 1030, or the network communicator 1040. The base station processor 1010 may also process information to be sent to the transceiver(s) 1050 for transmission through the antenna(s) 1055, to the base station communicator 1030, for transmission to one or more other base stations (e.g., base station 1005-*a* and base station 1005-*b*), or to the network communicator 1040 for transmission to a core network 1045, which may be an example of one or more aspects of the core network 130 described with reference to FIG. 1. The base station processor 1010 may handle, alone or in connection with the base station wireless communication manager 1060, various aspects of communicating over (or managing communications over) a dedicated RF spectrum band or a shared RF spectrum band. The dedicated RF spectrum band may include a RF spectrum band for which transmitting apparatuses may not contend for access (e.g., a RF spectrum band licensed to particular users for particular uses, such as a licensed RF spectrum band usable for LTE/LTE-A communications). The shared RF spectrum band may include a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner).

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitters and one or more separate base station receivers. The base station transceiver(s) 1050 may support communications in the dedicated RF spectrum band or the shared RF spectrum band. The base station transceiver(s) 1050 may be configured to communicate bi-directionally, via the antenna(s) 1055, with one or more UEs or apparatuses, such as one or more of the UEs 115, 215, or 515 described with reference to FIG. 1, 2, or 5, or the apparatus 815 or 915 described with reference to FIG. 8 or 9. The base station 1005 may, for example, include multiple base station antennas 1055 (e.g., an antenna array). The base station 1005 may communicate with the core network 1045 through the network communicator 1040. The base station 1005 may also communicate with other base stations, such as the base station 1005-a and the base station 1005-b, using the base station communicator 1030.

The base station wireless communication manager 1060 may be configured to perform or control some or all of the techniques or functions described with reference to FIG. 1, 2, 3, 4, 5, 6, or 7 related to wireless communication over the dedicated RF spectrum band or the shared RF spectrum band. For example, the base station wireless communication manager 1060 may be configured to provide configuration and management of SRS transmissions of one or more UEs in a shared RF spectrum band or a dedicated RF spectrum band as described herein. The base station wireless communication manager 1060 may include a base station LTE/LTE-A component for dedicated RF spectrum band 1065 configured to handle LTE/LTE-A communications in the dedicated RF spectrum band, and a base station LTE/LTE-A component for shared RF spectrum band 1070 configured to handle LTE/LTE-A communications in the shared RF spectrum band. The base station wireless communication manager 1060, or portions of it, may include a processor, or some or all of the functions of the base station wireless communication manager 1060 may be performed by the base station processor 1010 or in connection with the base station processor 1010. In some examples, the base station wireless communication manager 1060 may be an example of the base station wireless communication manager 620 or 720 described with reference to FIG. 6 or 7.

Figure 11:
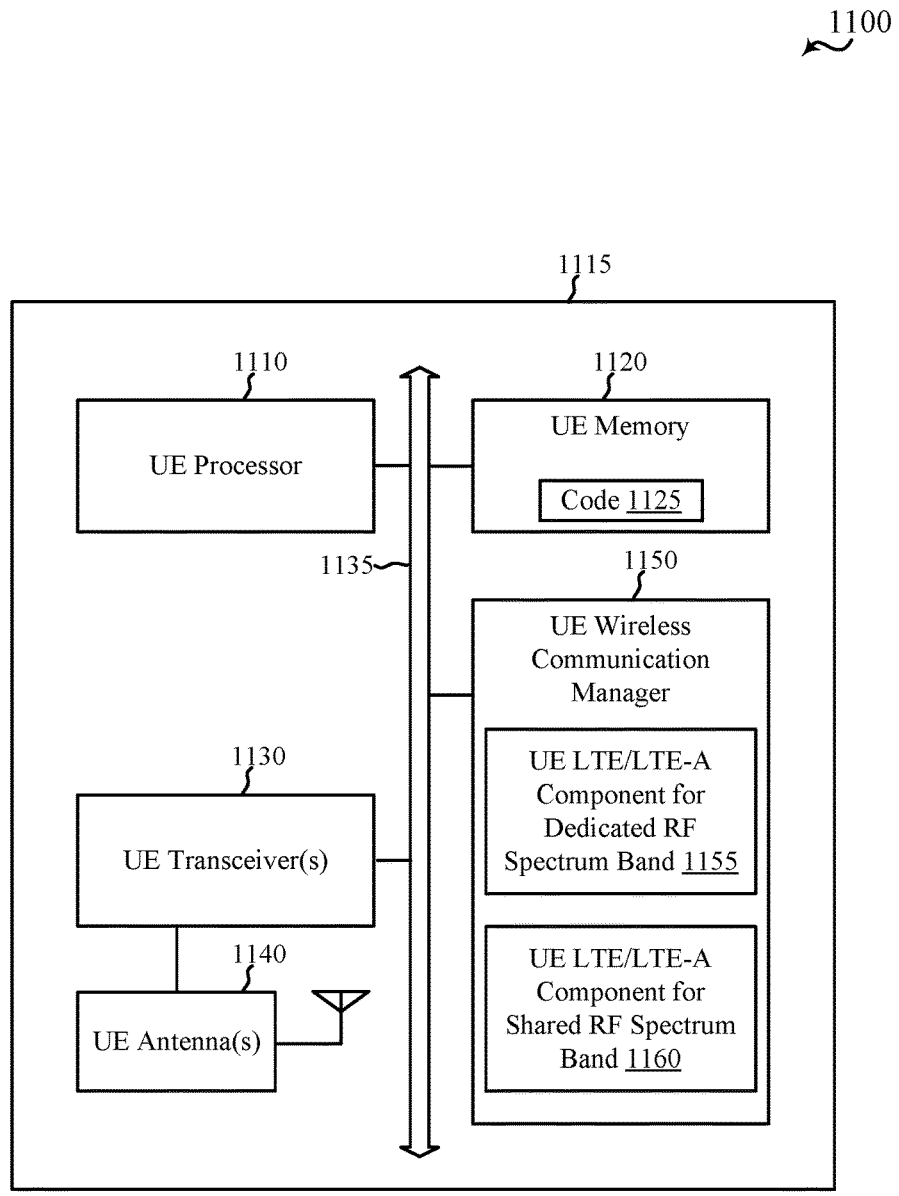
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 415, or 515 described with reference to FIG. 1, 2, 4, or 5, or aspects of the apparatus 815 or 915 described with reference to FIG. 8 or 9. The UE 1115 may be configured to implement at least some of the UE or apparatus techniques and functions described with reference to FIG. 1, 2, 3, 4, 5, 8, or 9.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include RAM or ROM. The UE memory 1120 may store computer-readable, computer-executable code 1125 containing instructions that are configured to, when executed, cause the UE processor 1110 to perform various functions described herein related to wireless communication, including, for example, transmitting SRS using a shared RF spectrum band as discussed herein. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a CPU, a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a dedicated RF spectrum band or a shared RF spectrum band. The dedicated RF spectrum band may include a RF spectrum band for which transmitting apparatuses may not contend for access (e.g., a RF spectrum band licensed to particular users for particular uses, such as a licensed RF spectrum band usable for LTE/LTE-A communications). The shared RF spectrum band may include a RF spectrum band for which transmitting apparatuses may contend for access (e.g., a RF spectrum band that is available for unlicensed use, such as Wi-Fi use, a RF spectrum band that is available for use by different radio access technologies, or a RF spectrum band that is available for use by multiple operators in an equally shared or prioritized manner).

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the dedicated RF spectrum band or the shared RF spectrum band. The UE transceiver(s) 1130 may be configured to communicate bi-directionally, via the UE antenna(s) 1140, with one or more of the base stations 105, 205, 405, 505, or 1005 described with reference to FIG. 1, 2, 4, 5, or 10, or aspects of one or more of the apparatuses 605 or 705 described with reference to FIG. 6 or 7. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 8, or 9 related to wireless communication over the dedicated RF spectrum band or the shared RF spectrum band. For example, the UE wireless communication manager 1150 may be configured to receive configuration information on CCs for uplink and downlink transmissions, SRS configuration information, and may manage SRS transmissions from the UE 1115 using the dedicated RF spectrum band or the shared RF spectrum band. The UE wireless communication manager 1150 may include a UE LTE/LTE-A component for dedicated RF spectrum band 1155 configured to handle LTE/LTE-A communications in the dedicated RF spectrum band, and a UE LTE/LTE-A component for shared RF spectrum band 1160 configured to handle LTE/LTE-A communications in the shared RF spectrum band. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the UE wireless communication manager 820 or 920 described with reference to FIG. 8 or 9.

Figure 12:
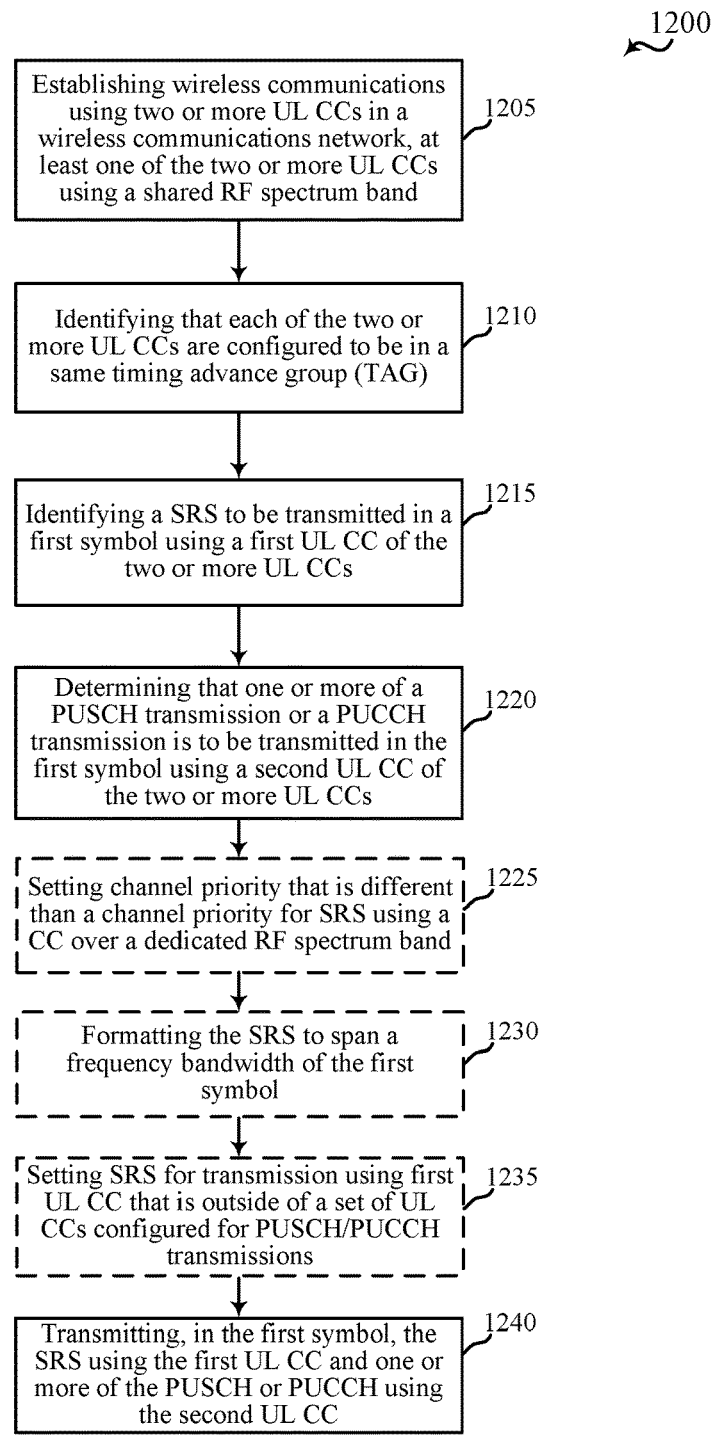
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115, 215, 415, 515, or 1115 described with reference to FIG. 1, 2, 4, 5, or 11, or aspects of one or more of the apparatuses 815 or 915 described with reference to FIG. 8 or 9. In some examples, a wireless device (which in some examples may include aspects of a UE or an apparatus described with reference to FIG. 1, 2, 4, 5, 8, 9, or 11) may execute one or more sets of codes to control the functional elements of the wireless device to perform the functions described below. Additionally or alternatively, the wireless device may perform one or more of the functions described below using special-purpose hardware.

At block 1205, the method 1200 may include establishing wireless communications using two or more UL CCs in a wireless communications network, at least one of the two or more UL CCs using a shared RF spectrum band. The operation(s) at block 1205 may be performed using the UE wireless communication manager 820 or 920, or the UE wireless communication manager 1150, described with reference to FIG. 8, 9, or 11, or the component carrier manager 835 or 935 described with reference to FIG. 8 or 9.

At block 1210, the method 1200 may include identifying that each of the two or more UL CCs are configured to be in a same timing advance group (TAG). The operation(s) at block 1210 may be performed using the UE wireless communication manager 820 or 920, or the UE wireless communication manager 1150, described with reference to FIG. 8, 9, or 11, or the timing advance group manager 840 or 940 described with reference to FIG. 8 or 9.

At block 1215, the method 1200 may include identifying a SRS to be transmitted in a first symbol using a first UL CC of the two or more UL CCs. The operation(s) at block 1215 may be performed using the UE wireless communication manager 820 or 920, or the UE wireless communication manager 1150, described with reference to FIG. 8, 9, or 11, or the SRS manager 845 or 945 described with reference to FIG. 8 or 9.

At block 1220, the method 1200 may include determining that one or more of a PUSCH transmission or a PUCCH transmission is to be transmitted in the first symbol using a second UL CC of the two or more UL CCs. The operation(s) at block 1220 may be performed using the UE wireless communication manager 820 or 920, or the UE wireless communication manager 1150, described with reference to FIG. 8, 9, or 11, or the SRS manager 845 or 945 described with reference to FIG. 8 or 9.

At optional block 1225, the method 1200 may include setting a channel priority that is different than a channel priority for SRS using a CC over a dedicated RF spectrum band. The operation(s) at block 1225 may be performed using the UE wireless communication manager 820 or 920, or the UE wireless communication manager 1150, described with reference to FIG. 8, 9, or 11, or the channel priority manager 965 described with reference to FIG. 9.

At block 1230, the method 1200 may include formatting the SRS to span a frequency bandwidth of the first symbol. The operation(s) at block 1230 may be performed using the UE wireless communication manager 820 or 920, or the UE wireless communication manager 1150, described with reference to FIG. 8, 9, or 11, or the SRS manager 845 or 945 described with reference to FIG. 8 or 9.

At optional block 1235, the method 1200 may include setting SRS for transmission using first UL CC that is outside of a set of UL CCs configured for PUSCH/PUCCH transmissions. The operation(s) at block 1235 may be performed using the UE wireless communication manager 820 or 920, or the UE wireless communication manager 1150, described with reference to FIG. 8, 9, or 11, or the UL SRS CC manager 960 described with reference to FIG. 9.

At block 1240, the method 1200 may include transmitting, in the first symbol, the SRS using the first UL CC and one or more of the PUSCH or PUCCH using the second UL CC. The operation(s) at block 1240 may be performed using the UE wireless communication manager 820 or 920, or the UE wireless communication manager 1150 in conjunction with transmitters 830 or 930 or UE transceiver(s) 1130, described with reference to FIG. 8, 9, or 11, or the SRS manager 845 or 945 in conjunction with transmitters 830 or 930 described with reference to FIG. 8 or 9.

Thus, the method 1200 may provide for wireless communication. It should be noted that the method 1200 is just one implementation and that the operations of the method 1200 may be rearranged or otherwise modified such that other implementations are possible.

Figure 13:
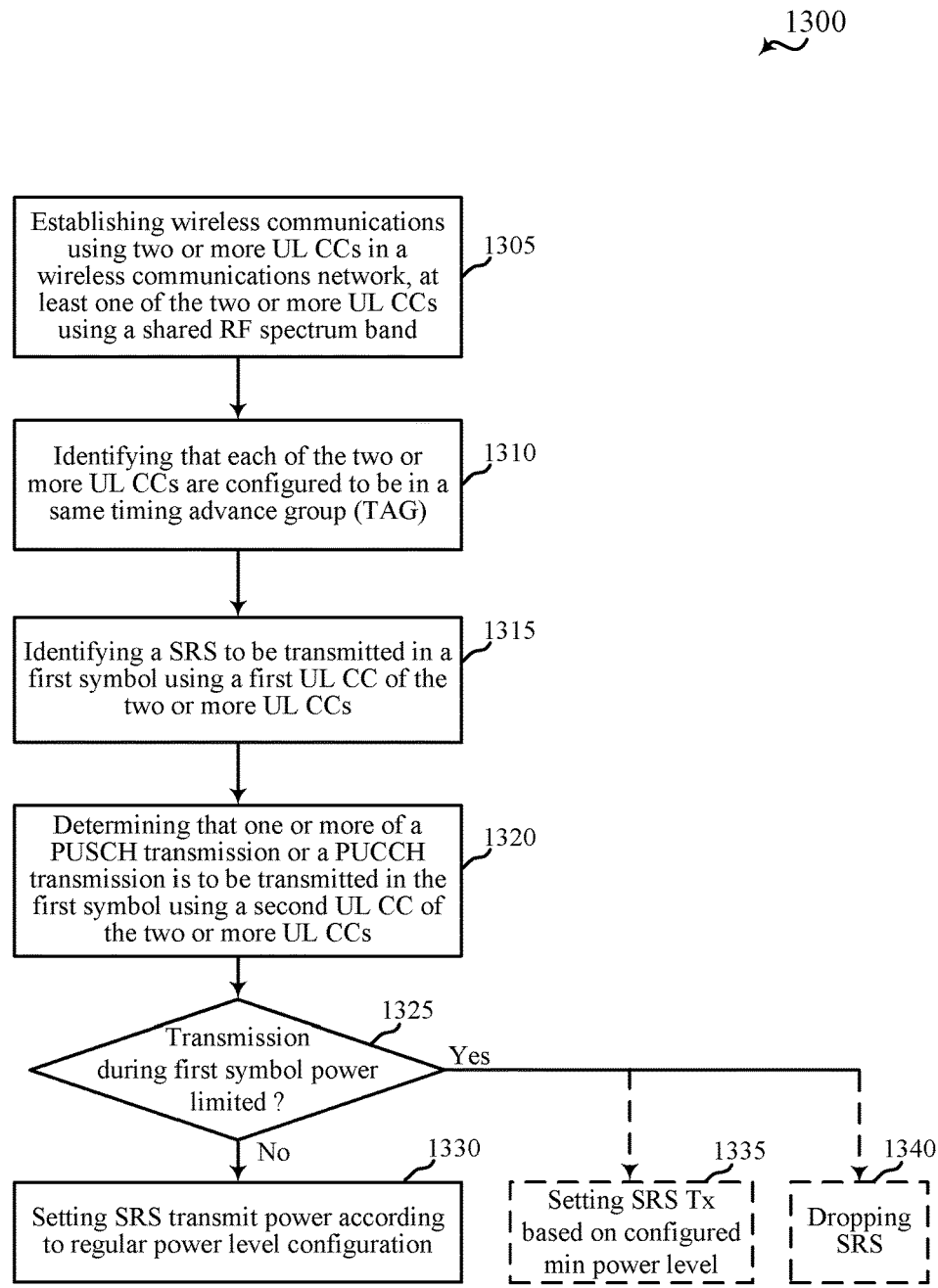
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115, 215, 415, 515, or 1115 described with reference to FIG. 1, 2, 4, 5, or 11, or aspects of one or more of the apparatuses 815 or 915 described with reference to FIG. 8 or 9. In some examples, a wireless device (which in some examples may include aspects of a UE or an apparatus described with reference to FIG. 1, 2, 4, 5, 8, 9, or 11) may execute one or more sets of codes to control the functional elements of the wireless device to perform the functions described below. Additionally or alternatively, the wireless device may perform one or more of the functions described below using special-purpose hardware.

At block 1305, the method 1300 may include establishing wireless communications using two or more UL CCs in a wireless communications network, at least one of the two or more UL CCs using a shared RF spectrum band. The operation(s) at block 1305 may be performed using the UE wireless communication manager 820 or 920, or the UE wireless communication manager 1150, described with reference to FIG. 8, 9, or 11, or the component carrier manager 835 or 935 described with reference to FIG. 8 or 9.

At block 1310, the method 1300 may include identifying that each of the two or more UL CCs are configured to be in a same timing advance group (TAG). The operation(s) at block 1310 may be performed using the UE wireless communication manager 820 or 920, or the UE wireless communication manager 1150, described with reference to FIG.

8, 9, or 11, or the timing advance group manager 840 or 940 described with reference to FIG. 8 or 9.

At block 1315, the method 1300 may include identifying a SRS to be transmitted in a first symbol using a first UL CC of the two or more UL CCs. The operation(s) at block 1315 may be performed using the UE wireless communication manager 820 or 920, or the UE wireless communication manager 1150, described with reference to FIG. 8, 9, or 11, or the SRS manager 845 or 945 described with reference to FIG. 8 or 9.

At block 1320, the method 1300 may include determining that one or more of a PUSCH transmission or a PUCCH transmission is to be transmitted in the first symbol using a second UL CC of the two or more UL CCs. The operation(s) at block 1320 may be performed using the UE wireless communication manager 820 or 920, or the UE wireless communication manager 1150, described with reference to FIG. 8, 9, or 11, or the SRS manager 845 or 945 described with reference to FIG. 8 or 9.

At block 1325, the method 1300 may include determining if a transmission during the first symbol is power limited. The operation(s) at block 1320 may be performed using the UE wireless communication manager 820 or 920, or the UE wireless communication manager 1150, described with reference to FIG. 8, 9, or 11, or the transmit power manager 950 described with reference to FIG. 9.

If it is determined that the transmission is not power limited the method, at block 1330 may include setting SRS transmit power according to regular power level configuration. The operation(s) at block 1330 may be performed using the UE wireless communication manager 820 or 920, or the UE wireless communication manager 1150, described with reference to FIG. 8, 9, or 11, or the transmit power manager 950 described with reference to FIG. 9.

If it is determined that the transmission is power limited the method, at block 1335 may optionally include setting SRS transmit power based on a configured minimum power level. The operation(s) at block 1335 may be performed using the UE wireless communication manager 820 or 920, or the UE wireless communication manager 1150, described with reference to FIG. 8, 9, or 11, or the transmit power manager 950 described with reference to FIG. 9.

If it is determined that the transmission is power limited the method, at block 1340 may optionally include dropping the SRS transmission. The operation(s) at block 1340 may be performed using the UE wireless communication manager 820 or 920, or the UE wireless communication manager 1150, described with reference to FIG. 8, 9, or 11, or the transmit power manager 950 described with reference to FIG. 9.

Thus, the method 1300 may provide for wireless communication. It should be noted that the method 1300 is just one implementation and that the operations of the method 1300 may be rearranged or otherwise modified such that other implementations are possible.

Figure 14:
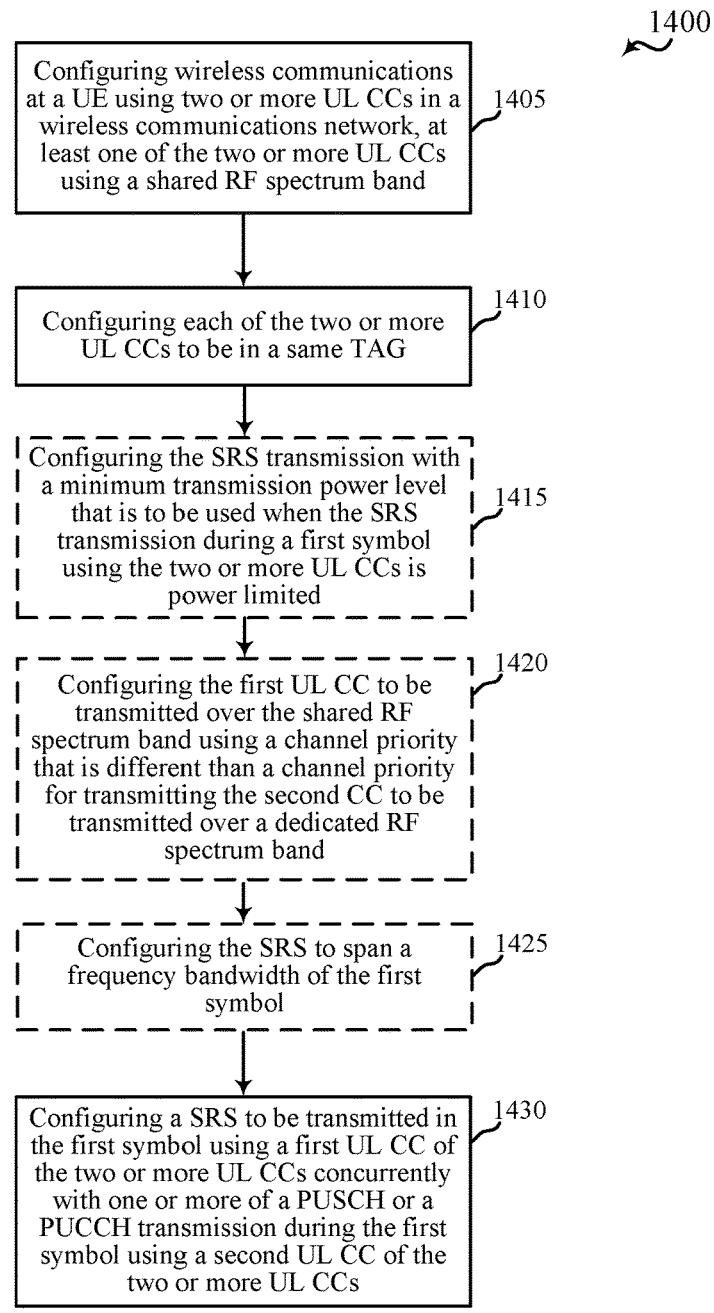
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105, 205, 405, 505, or 1005 described with reference to FIG. 1, 2, 4, 5, or 10, or aspects of one or more of the apparatuses 605 or 705 described with reference to FIG. 6 or 7. In some examples, a wireless device (which in some examples may include aspects of a base station, or an apparatus described with reference to FIG. 1, 2, 4, 5, 6, 7, or 10) may execute one or more sets of codes to control the functional elements of the wireless device to perform the functions described below. Additionally or alternatively, the wireless device may perform one or more of the functions described below using special-purpose hardware.

At block 1405, the method 1400 may include configuring wireless communications at a UE using two or more UL CCs in a wireless communications network, at least one of the two or more UL CCs using a shared RF spectrum band. The operation(s) at block 1405 may be performed using the base station wireless communication manager 620 or 720, the base station wireless communication manager 1060, described with reference to FIG. 6, 7, or 10, or the component carrier manager 635 or 735 described with reference to FIG. 6 or 7.

At block 1410, the method 1400 may include configuring each of the two or more UL CCs to be in a same TAG. The operation(s) at block 1410 may be performed using the base station wireless communication manager 620 or 720, the base station wireless communication manager 1060, described with reference to FIG. 6, 7, or 10, or the timing advance group manager 640 or 740 described with reference to FIG. 6 or 7.

At optional block 1415, the method 1400 may include configuring the SRS transmission based on a minimum transmission power level that is to be used when the SRS transmission during a first symbol using the two or more UL CCs is power limited. The operation(s) at block 1415 may be performed using the base station wireless communication manager 620 or 720, the base station wireless communication manager 1060, described with reference to FIG. 6, 7, or 10, or the transmit power manager 755 described with reference to FIG. 7.

At optional block 1420, the method 1400 may include configuring the first UL CC to be transmitted over the shared RF spectrum band using a channel priority that is different than a channel priority for transmitting the second CC to be transmitted over a dedicated RF spectrum band. The operation(s) at block 1420 may be performed using the base station wireless communication manager 620 or 720, the base station wireless communication manager 1060, described with reference to FIG. 6, 7, or 10, or the channel priority configuration manager 765 described with reference to FIG. 7.

At optional block 1425, the method 1400 may include configuring the SRS to span a frequency bandwidth of the first symbol. The operation(s) at block 1425 may be performed using the base station wireless communication manager 620 or 720, the base station wireless communication manager 1060, described with reference to FIG. 6, 7, or 10, or the frequency resource manager 760 described with reference to FIG. 7.

At block 1430, the method 1400 may include configuring a SRS to be transmitted in the first symbol using a first UL CC of the two or more UL CCs concurrently with one or more of a PUSCH or a PUCCH transmission during the first symbol using a second UL CC of the two or more UL CCs. The operation(s) at block 1430 may be performed using the base station wireless communication manager 620 or 720, the base station wireless communication manager 1060, described with reference to FIG. 6, 7, or 10, or the configuration information manager 645 or 745 described with reference to FIG. 6 or 7.

Thus, the method 1400 may provide for wireless communication. It should be noted that the method 1400 is just one implementation and that the operations of the method 1400 may be rearranged or otherwise modified such that other implementations are possible.

In some examples, aspects of the methods 1200, 1300, or 1400 described with reference to FIG. 12, 13, or 14 may be combined. It should be noted that the methods 1200, 1300, or 1400 are just example implementations, and that the operations of the methods 1200, 1300, or 1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1X, 1X, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   establishing wireless communications using two or more uplink component carriers (CCs) in a wireless communications network, wherein a first uplink CC of the two or more uplink CCs uses a shared radio frequency (RF) spectrum band that is available for unlicensed use;
   identifying that each of the two or more uplink CCs are configured to be in a same timing advance group (TAG);
   identifying a sounding reference signal (SRS) to be transmitted in a first symbol using the first uplink CC of the two or more uplink CCs;
   determining that one or more of a physical uplink shared channel (PUSCH) transmission or a physical uplink control channel (PUCCH) transmission is to be transmitted in the first symbol using a second uplink CC of the two or more uplink CCs;
   determining that the transmission during the first symbol using the two or more uplink CCs is power limited; and
   transmitting the SRS in the first symbol, using a minimum guaranteed power level configured for transmission of the first uplink CC, using the first uplink CC, and transmitting one or more of the PUSCH or PUCCH using the second uplink CC.

2. The method of claim 1, wherein the transmitting further comprises:
   dropping the transmission of the SRS.

3. The method of claim 1, wherein the transmitting further comprises:
   transmitting the SRS during a regular uplink subframe of a radio frame.

4. The method of claim 1, wherein the transmitting further comprises:
   transmitting the SRS during a special subframe of a radio frame.

5. The method of claim 4, wherein the transmitting further comprises:
   transmitting two or more SRS symbols during an uplink pilot time slot (UpPTS) of the special subframe.

6. The method of claim 1, wherein the transmitting further comprises:
   transmitting the SRS using the first uplink CC over the shared RF spectrum band using a channel priority that is different than a channel priority for transmitting the SRS using a CC over a dedicated RF spectrum band.

7. The method of claim 1, wherein the transmitting further comprises:
   formatting the SRS to span a frequency bandwidth of the first symbol.

8. The method of claim 7, wherein the formatting is based at least in part on a power spectral density limit of the frequency bandwidth.

9. The method of claim 1, wherein the two or more uplink CCs comprise a first set of uplink CCs that are allocated for uplink transmissions during a transmission time interval (TTI), and wherein the transmitting further comprises:
   transmitting one or more of the PUCCH transmission or PUSCH transmission using the first set of uplink CCs; and
   transmitting the SRS using a different uplink CC that is outside of the first set of uplink CCs.

10. The method of claim 9, wherein the different uplink CC is a CC associated with a second set of downlink CCs, and wherein the first set of uplink CCs comprise fewer CCs than the second set of downlink CCs.

11. The method of claim 1, wherein the first uplink CC and the second uplink CC are different CCs.

12. A method for wireless communication at a base station, comprising:
   configuring wireless communications at a user equipment (UE) using two or more uplink component carriers (CCs) in a wireless communications network, wherein a first uplink CC of the two or more uplink CCs uses a shared radio frequency (RF) spectrum band that is available for unlicensed use;
   configuring each of the two or more uplink CCs to be in a same timing advance group (TAG); and
   configuring a sounding reference signal (SRS) to be transmitted in a first symbol, based at least in part on a minimum guaranteed power level that is to be used when transmitting using the first uplink CC, using the first uplink CC of the two or more uplink CCs concurrently with one or more of a physical uplink shared channel (PUSCH) transmission or a physical uplink control channel (PUCCH) transmission to be transmitted during the first symbol using a second uplink CC of the two or more uplink CCs.

13. The method of claim 12, wherein the configuring the SRS to be transmitted further comprises:
   configuring the SRS to be transmitted during a regular uplink subframe of a radio frame.

14. The method of claim 12, wherein the configuring the SRS to be transmitted further comprises:
   configuring the SRS to be transmitted during a special subframe of a radio frame.

15. The method of claim 14, wherein the configuring further comprises:
   configuring one or more SRS symbols to be transmitted during an uplink pilot time slot (UpPTS) of the special subframe.

16. The method of claim 12, wherein the configuring the SRS to be transmitted further comprises:
   configuring the first uplink CC to be transmitted over the shared RF spectrum band using a channel priority that is different than a channel priority for transmitting the second uplink CC to be transmitted over a dedicated RF spectrum band.

17. The method of claim 12, wherein the configuring the SRS to be transmitted further comprises:

configuring the SRS to span a frequency bandwidth of the first symbol.

18. The method of claim 17, wherein the frequency bandwidth for the SRS is configured based at least in part on a power spectral density limit of the frequency bandwidth.

19. The method of claim 12, further comprising:
allocating a first set of uplink CCs that includes the two or more uplink CCs for uplink transmissions during a transmission time interval (TTI);
transmitting downlink transmissions using a second set of downlink CCs that includes different CCs than the first set of uplink CCs; and
wherein the configuring the SRS to be transmitted further comprises configuring the SRS to be transmitted using a CC of the second set of downlink CCs that is outside of the first set of uplink CCs.

20. The method of claim 12, wherein the first uplink CC and the second uplink CC are different CCs.

21. An apparatus for wireless communication, comprising:
a processor;
memory in electronic communication with the processor; and
instructions stored in the memory and operable, when executed by the processor, to cause the apparatus to:
establish wireless communications using two or more uplink component carriers (CCs) in a wireless communications network, wherein a first uplink CC of the two or more uplink CCs uses a shared radio frequency (RF) spectrum band that is available for unlicensed use;
identify that each of the two or more uplink CCs are configured to be in a same timing advance group (TAG);
identify a sounding reference signal (SRS) to be transmitted in a first symbol using the first uplink CC of the two or more uplink CCs;
determine that one or more of a physical uplink shared channel (PUSCH) transmission or a physical uplink control channel (PUCCH) transmission is to be transmitted in the first symbol using a second uplink CC of the two or more uplink CCs;
determine that the transmission during the first symbol using the two or more uplink CCs is power limited;
transmit the SRS in the first symbol, using a minimum guaranteed power level configured for transmission of the first uplink CC, using the first uplink CC, and transmit one or more of the PUSCH or PUCCH using the second uplink CC.

22. An apparatus for wireless communication, comprising:
a processor;
memory in electronic communication with the processor; and instructions stored in the memory and operable, when executed by the processor, to cause the apparatus to:
configure wireless communications at a user equipment (UE) using two or more uplink component carriers (CCs) in a wireless communications network, wherein a first uplink CC of the two or more uplink CCs uses a shared radio frequency (RF) spectrum band that is available for unlicensed use;
configure each of the two or more uplink CCs to be in a same timing advance group (TAG); and
configure a sounding reference signal (SRS) to be transmitted in a first symbol, based at least in part on a minimum guaranteed power level configured for transmission of the first uplink CC, using the first uplink CC of the two or more uplink CCs concurrently with one or more of a physical uplink shared channel (PUSCH) transmission or a physical uplink control channel (PUCCH) transmission to be transmitted during the first symbol using a second uplink CC of the two or more uplink CCs.

* * * * *